United States Patent
Her et al.

(10) Patent No.: US 12,205,545 B2
(45) Date of Patent: Jan. 21, 2025

(54) ELECTRONIC DEVICE AND METHOD FOR DRIVING DISPLAY THEREOF

(71) Applicant: Samsung Electronics Co., Ltd., Suwon-si (KR)

(72) Inventors: Yongkoo Her, Suwon-si (KR); Kiwoo Kim, Suwon-si (KR); Seoungyong Park, Suwon-si (KR); Hongkook Lee, Suwon-si (KR); Euntaek Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/347,402

(22) Filed: Jul. 5, 2023

(65) Prior Publication Data

US 2024/0087523 A1 Mar. 14, 2024

Related U.S. Application Data

(63) Continuation of application No. PCT/KR2023/008127, filed on Jun. 13, 2023.

(30) Foreign Application Priority Data

Sep. 13, 2022 (KR) .................. 10-2022-0115086
Oct. 25, 2022 (KR) .................. 10-2022-0138228

(51) Int. Cl.
*G09G 3/3233* (2016.01)
*G06F 3/01* (2006.01)
(Continued)

(52) U.S. Cl.
CPC .......... *G09G 3/3233* (2013.01); *G06F 3/013* (2013.01); *G09G 3/2096* (2013.01);
(Continued)

(58) Field of Classification Search
CPC .............. G09G 3/3233; G09G 3/2096; G09G 3/3266; G09G 2310/08; G09G 2320/0247;
(Continued)

(56) References Cited

U.S. PATENT DOCUMENTS 6,429,839 B1 * 8/2002 Sakamoto ............ G09G 3/3406
345/87
10,056,057 B2 8/2018 Perreault
(Continued)

FOREIGN PATENT DOCUMENTS

CN 108122535 A 6/2018
CN 109473082 A 3/2019
(Continued)

OTHER PUBLICATIONS

PCT International Search Report dated Sep. 22, 2023 for PCT/KR2023/008127.
(Continued)

*Primary Examiner* — Tom V Sheng
(74) *Attorney, Agent, or Firm* — Nixon & Vanderhye P.C.

(57) ABSTRACT

An electronic device may include a display module for displaying image data, and a processor operatively connected to the display module to provide the image data to the display module, and the display module may include a display panel including a plurality of pixel lines including a plurality of pixels, and a display driving circuit for driving a plurality of pixels of the display panel. Various other embodiments are possible.

19 Claims, 14 Drawing Sheets

(51) Int. Cl.
*G09G 3/20* (2006.01)
*G09G 3/3266* (2016.01)
(52) U.S. Cl.
CPC ....... *G09G 3/3266* (2013.01); *G09G 2310/08* (2013.01); *G09G 2320/0247* (2013.01); *G09G 2320/0261* (2013.01); *G09G 2320/041* (2013.01); *G09G 2330/021* (2013.01); *G09G 2340/0435* (2013.01); *G09G 2354/00* (2013.01)
(58) Field of Classification Search
CPC ..... G09G 2320/0261; G09G 2320/041; G09G 2330/021; G09G 2340/0435; G09G 2354/00; G06F 3/013
USPC ......................................................... 345/156
See application file for complete search history.

(56) References Cited

U.S. PATENT DOCUMENTS

| | | |
|---|---|---|
| 10,771,772 B2 | 9/2020 | Ukai et al. |
| 10,902,793 B2 | 1/2021 | Oh et al. |
| 10,997,884 B2 | 5/2021 | Cook |
| 11,030,962 B2 | 6/2021 | Lee et al. |
| 11,158,261 B2 | 10/2021 | Kim et al. |
| 11,320,900 B2 | 5/2022 | Mor |
| 11,341,934 B2 | 5/2022 | Lee et al. |
| 11,367,379 B1* | 6/2022 | Park ..................... G09G 3/3266 |
| 11,417,262 B2* | 8/2022 | Kang ..................... G11C 19/28 |
| 2012/0044333 A1 | 2/2012 | Kang |
| 2013/0021386 A1 | 1/2013 | Min et al. |
| 2016/0063962 A1* | 3/2016 | Park ..................... G09G 3/3666 345/211 |
| 2016/0358561 A1 | 12/2016 | Chen et al. |
| 2017/0255259 A1 | 9/2017 | Mor |
| 2018/0074569 A1* | 3/2018 | An ........................ G06F 1/3265 |
| 2020/0402478 A1* | 12/2020 | Her ........................ G09G 3/3233 |
| 2021/0239997 A1 | 8/2021 | St. Hilaire |
| 2021/0335325 A1* | 10/2021 | Her ........................ G09G 5/10 |
| 2022/0051620 A1 | 2/2022 | Song et al. |
| 2022/0068194 A1* | 3/2022 | Kim ........................ G09G 3/32 |
| 2023/0252936 A1* | 8/2023 | Lin ........................ G09G 3/32 345/214 |
| 2024/0038143 A1* | 2/2024 | Yang ........................ G09G 3/32 |
| 2024/0040265 A1* | 2/2024 | Park ........................ G09G 5/10 |

FOREIGN PATENT DOCUMENTS

| | | |
|---|---|---|
| CN | 111326119 A | 6/2020 |
| CN | 112689142 A | 4/2021 |
| KR | 10-2012-0018591 A | 3/2012 |
| KR | 10-2013-0011906 A | 1/2013 |
| KR | 10-2017-0084191 A | 7/2017 |
| KR | 10-2021-0158458 A | 12/2021 |
| KR | 10-2022-0021059 A | 2/2022 |
| WO | WO 2024/058357 A1 | 3/2024 |

OTHER PUBLICATIONS

PCT Notification of Publication dated Mar. 21, 2024 for PCT/KR2023/008127.

* cited by examiner

ELECTRONIC DEVICE AND METHOD FOR DRIVING DISPLAY THEREOF

CROSS-REFERENCE TO RELATED APPLICATIONS

This application is a continuation of International Application No. PCT/KR2023/008127 filed on Jun. 13, 2023, designating the United States, in the Korean Intellectual Property Receiving Office, and claiming priority to KR Patent Application No. 10-2022-0115086 filed on Sep. 13, 2022, and to KR Patent Application No. 10-2022-0138228 filed on Oct. 25, 2022, in the Korean Intellectual Property Office, the disclosures of all of which are hereby incorporated by reference herein in their entireties.

BACKGROUND

Field

Certain example embodiments relate to an electronic device, and for example, to an electronic device capable of providing augmented reality content or virtual reality content, and/or a method for driving a display in the electronic device.

Description of Related Art

Various technologies capable of providing an augmented reality (AR) environment and/or a virtual reality (VR) environment to users are being developed. For example, the VR environment may provide a rendered image of a virtual space to a user, and the AR environment may provide an image representing the real world by overlaying a virtual object. Such the AR environment and the VR environment may be provided by a wearable device (hereinafter, referred to as an electronic device) that may be worn on the user's body, such as a head mounted device or a glasses-type device (e.g., AR glasses). The electronic device may output light forming image information through a display and allow the image information to be recognized in the user's gaze direction through an optical structure.

Because an electronic device (e.g., especially a VR device) forms image information adjacent to the user's eyes, the user may experience VR/AR sickness while watching content by wearing the electronic device. In order to improve such VR/AR sickness in the electronic device, it is necessary to increase the response speed of the display. Accordingly, electronic devices are being developed in the direction of increasing a driving frequency and/or a refresh rate of the display.

SUMMARY

When the driving frequency of the display is increased, the operating speed of the processor providing image data to the display in the electronic device may also increase in proportion to the driving speed of the display driving circuit. Accordingly, power consumption of the entire electronic device increases, and a heat generation issue may occur. In order to improve such the increase in power consumption and the heat generation issue, it is desirable to dynamically control the display driving frequency.

In dynamically controlling the driving frequency of the display, flicker and/or motion blur may occur depending on what timing the light-emitting duty is driven at.

According to various example embodiments, an electronic device may include a display module for displaying image data, and a processor operatively connected, directly or indirectly, to the display module to provide the image data to the display module, and the display module may include a display panel including a plurality of pixel lines and a plurality of pixels, and a display driving circuit for driving a plurality of pixels of the display panel.

According to various example embodiments, the display driving circuit may be configured to identify a driving frequency for displaying the image data provided from the processor on the display panel, and output a light-emitting control signal for emitting light from a specified pixel line among the plurality of pixel lines to the display panel, based on the identified driving frequency, and the display driving circuit, when the identified driving frequency is greater than or equal to the specified reference frequency, may be configured to configure a first time period from a data refresh timing to a specified time point during one refresh cycle as a light-emitting period for emitting light from the specified pixel line to configure a plurality of light-emitting duties for emitting light from the designated pixel line within the first time period, and configure a second time period from the specified time point to the next data refresh timing as a non-light-emitting period for not emitting light from the specified pixel line not to configure the light-emitting duty for the specified pixel line.

A method for driving a display of an electronic device according to various example embodiments may include identifying a driving frequency for displaying image data on a display panel, generating a light-emitting control signal for emitting light from a specified pixel line among the plurality of pixel lines of the display panel, based on the identified driving frequency, and outputting the generated light-emitting control signal to the display panel.

According to various example embodiments, the generating the light-emitting control signal, when the identified driving frequency is greater than or equal to the specified reference frequency, may include configuring a first time period from a data refresh timing to a specified time point in one refresh cycle as a light-emitting period for emitting light from the specified pixel line to configure a plurality of light-emitting duties for emitting light from the specified pixel line within the first time period, and configuring a second time period from the specified time point to the next data refresh timing as a non-light-emitting period for not emitting light from the specified pixel line not to configure the light-emitting duty for the specified pixel line.

According to various example embodiments, when changing a display driving frequency for the purpose of improving power consumption in an electronic device providing a VR or AR environment, it is possible to provide a display driving method capable of reducing flicker and motion blur along with a seamless change in driving frequency.

BRIEF DESCRIPTION OF DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
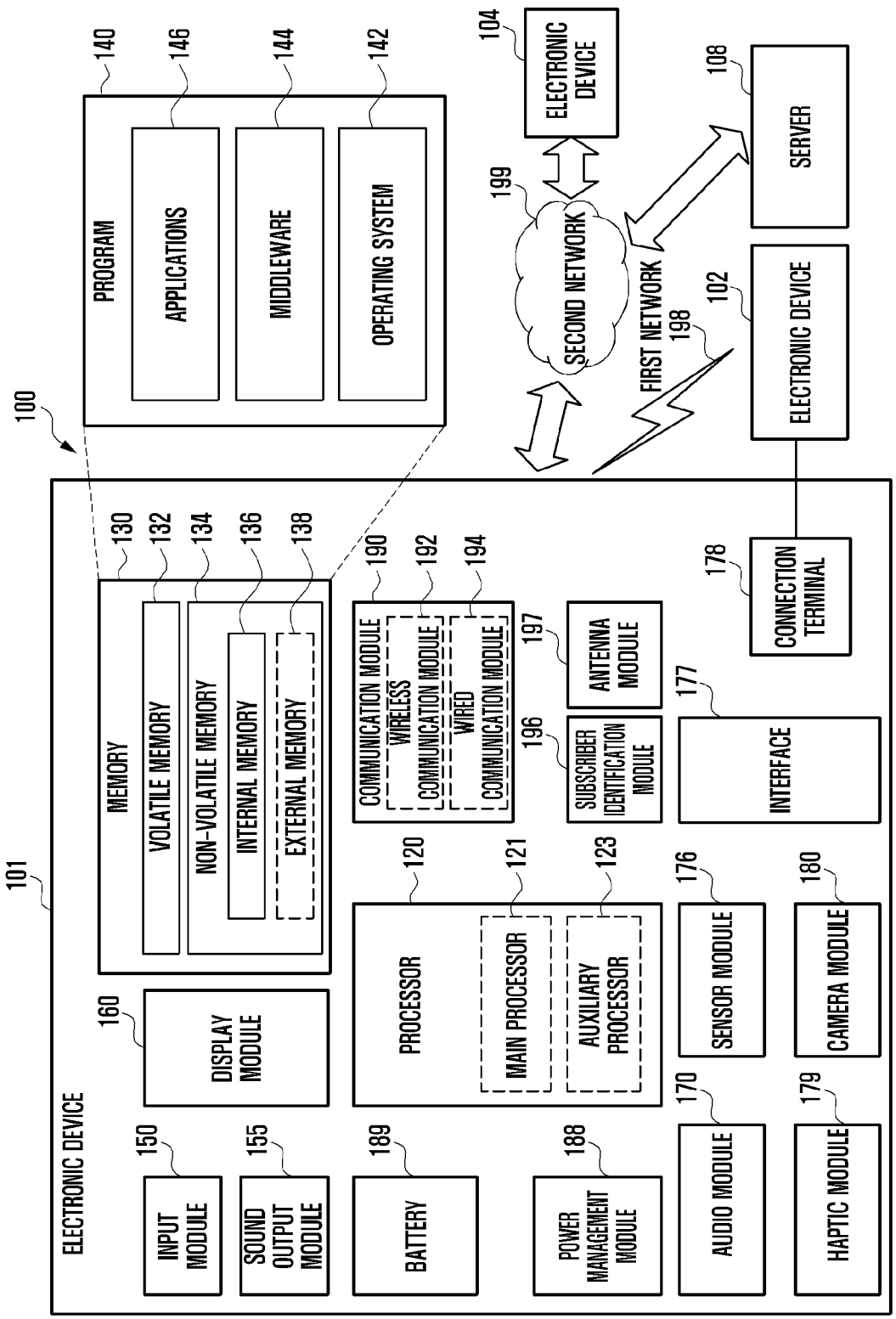
FIG. 1 is a block diagram of an electronic device in a network environment according to various example embodiments.

Hereinafter, example embodiments will be described in detail with reference to the drawings so that those of ordinary skill in the art to which the disclosure pertains may easily implement the disclosure. However, the disclosure may be implemented in many different forms and is not limited to the embodiments described herein. With respect to the description of the drawings, the same or similar reference numerals may be used for the same or similar components. In addition, in drawings and related descriptions, descriptions of well-known functions and configurations may be omitted for clarity and brevity.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted 6oltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting/connection terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
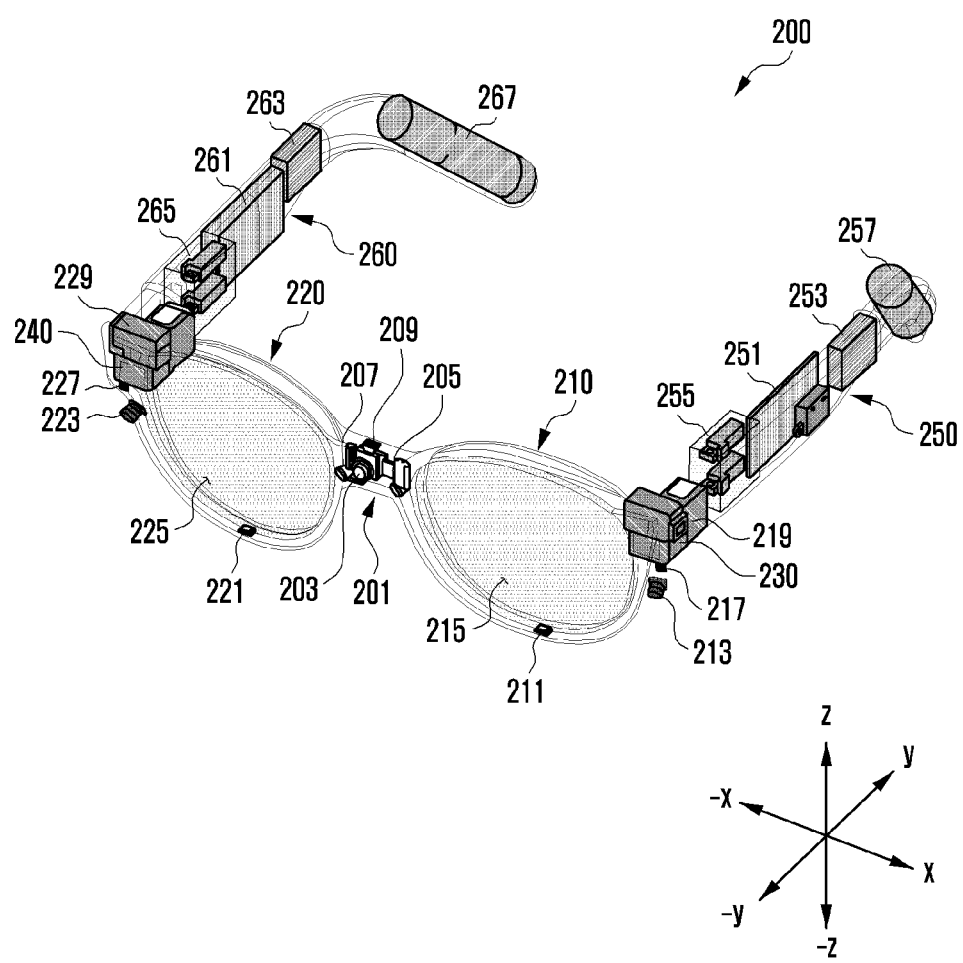
FIG. 2 is a perspective view of an electronic device according to various example embodiments.

FIG. 2 is a perspective view of an electronic device according to various embodiments.

Although the structure of a wearable electronic device in the form of glasses (e.g., AR glasses, smart glasses) is described in FIG. 2, the electronic device according to various example embodiments may be implemented as another type of electronic device wearable by a user. The electronic device 200 may further include at least some of the configurations and/or functions of the electronic device 101 of FIG. 1.

Referring to FIG. 2, the electronic device 200 according to various embodiments may include a bridge 201, a first rim 210, a second rim 220, a first end piece 230, a second end piece 240, a first temple/template 250, and/or a second temple/template 260.

According to an embodiment, the bridge 201 may connect the first rim 210 and the second rim 220. When a user wears the electronic device 200, the bridge 201 may be located on the user's nose. The bridge 201 may separate the first rim 210 and the second rim 220 from each other based on the user's nose.

According to various embodiments, the bridge 201 may include a camera module 203, a first gaze tracking camera 205, a second gaze tracking camera 207, and/or an audio module 209.

According to various embodiments, the camera module 203 (e.g., the camera module 180 of FIG. 1, comprising a camera) may photograph the front of the user (e.g., the −y-axis direction) and obtain image data. The camera module 203 may photograph an image corresponding to the user's field of view (FOV) or measure a distance from a subject. The camera module 203 may include an RGB camera, a high resolution (HR) camera, and/or a photo video (PV) camera. The camera module 203 may include a color camera with an autofocus (AF) function and an optical image stabilization (OIS) function to acquire a high-definition image.

According to various embodiments, the first gaze tracking camera 205 and the second gaze tracking camera 207 may identify the user's gaze. The first gaze tracking camera 205 and the second gaze tracking camera 207 may photograph the user's eyes substantially opposite to the photographing direction of the camera module 203 (e.g., the y direction). For example, the first gaze tracking camera 205 may photograph at least a part of the user's left eye, and the second gaze tracking camera 207 may photograph at least a part of the user's right eye. The first gaze tracking camera 205 and the second gaze tracking camera 207 may detect the user's eyes (e.g., left and right eyes) and track the gaze direction. The tracked gaze direction may be used to move the center of the virtual image including a virtual object corresponding to the gaze direction. For example, the first gaze tracking camera 205 the second gaze tracking camera 207 may track the user's gaze by using at least one of an EOG sensor (electro-oculography or electrooculogram), a coil system, a dual Purkinje system, bright pupil systems, or dark pupil systems.

According to various embodiments, the audio module 209 (e.g., the audio module 170 of FIG. 1, comprising audio circuitry) may be disposed between the first gaze tracking camera 205 and the second gaze tracking camera 207. The audio module 209 may convert a user's voice and/or external sound into an electrical signal or convert the electrical signal into a sound. The audio module 209 may include a microphone.

According to an embodiment, the first rim 210 and the second rim 220 may form a frame (e.g., an AR glasses frame) of the electronic device 200. The first rim 210 may be disposed in a first direction (e.g., an x-axis direction) of the bridge 201. The first rim 210 may be disposed at a location corresponding to the left eye of the user. The second rim 220 may be disposed in the second direction (e.g., a −x-axis direction) of the bridge 201 substantially opposite to the first direction (e.g., the x-axis direction). The second rim 220 may be disposed at a location corresponding to the right eye of the user. The first rim 210 and the second rim 220 may be composed of a metal material and/or a non-conductive material (e.g., polymer).

According to various embodiments, the first rim 210 may surround and support at least a part of the first glass 215 disposed on the inner circumferential surface. The first glass 215 may be located in front of the user's left eye. The second rim 220 may surround and support at least a part of the second glass 225 disposed on the inner circumferential surface. The second glass 225 may be located in front of the user's right eye. The user of the electronic device 200 may view a foreground (e.g., real image or real information) of an external object through the first glass 215 and the second glass 225. The electronic device 200 may implement augmented reality by overlapping and displaying a virtual image on real information including the external object.

According to various embodiments, the first glass 215 and the second glass 225 may include a projection type transparent display. The first glass 215 and the second glass 225 may form a reflective surface as a transparent plate (or transparent screen), respectively, and the image generated by the electronic device 200 may be reflected (e.g., total internal reflection) through the reflective surface and incident into the user's left and/or right eye.

According to various embodiments, the first glass 215 may include a waveguide (or an optical waveguide) that transmits light generated by a light source (not illustrated) of the electronic device 200 to the user's left eye. For example, the waveguide may be made of glass, plastic, or polymer material, and may include a nano pattern (e.g., a polygonal or curved grating structure or a mesh structure) formed inside or on the surface of the first glass 215. The waveguide may include at least one of a diffraction element (e.g., a diffractive optical element (DOE) or a holographic optical element (HOE)) or a reflection element (e.g., a reflective mirror). The wave guide may use at least one diffraction element or reflection element included in the waveguide to guide the display light emitted from the light source to the user's eyes. In various embodiments, the diffraction element may include an input/output optical member, and the reflection element may include total internal reflection (TIR). For example, light emitted from the light source may be guided through an input optical member (e.g., an in-coupler) to the waveguide, and light moving inside the waveguide may be guided toward the user's eye through an output optical member (e.g., an out-coupler).

The second glass 225 may be implemented in substantially the same manner as the first glass 215. An optical path formed through the waveguides of the first glass 215 and the second glass 225 will be described in detail with reference to FIG. 3.

According to various embodiments, the first glass 215 and the second glass 225 may include, for example, a liquid crystal display (LCD), a digital mirror device (DMD), a liquid crystal on silicon (LCoS), a light-emitting diode (LED) on silicon (LEDoS), an organic light-emitting diode (OLED), an organic light-emitting diode on silicon (OLEDoS), or a micro light-emitting diode (micro LED). Although not illustrated, when the first glass 215 and the second glass 225 are made of one of the liquid crystal display, the digital mirror device, or the liquid crystal on silicon, the electronic device 200 may include a light source that radiates light to the screen output area of the first glass 215 and the second glass 225. In another embodiment, when the first glass 215 and the second glass 225 are capable of generating light by themselves, for example, made of either an organic light-emitting diode or a micro LED, the electronic device 200 may provide a virtual image of relatively good quality to the user even without a separate light source.

According to various embodiments, the first rim 210 may include a first microphone 211, a first recognition camera 213, a first light-emitting device 217, and/or a first display module 219 comprising a display. The second rim 220 may include a second microphone 221, a second recognition camera 223, a second light-emitting device 227, and/or a second display module 229 comprising a display.

In various embodiments, the first light-emitting device 217 and the first display module 219 may be included in the first end piece 230, and the second light-emitting device 227 and the second display module 229 may be included in the second end piece 240.

According to various embodiments, the first microphone 211 and/or the second microphone 221 may receive the user's voice of the electronic device 200 and/or external sound, and convert the same into an electrical signal.

According to various embodiments, the first recognition camera 213 and/or the second recognition camera 223 may recognize the surrounding space of the electronic device 200. The first recognition camera 213 and/or the second recognition camera 223 may detect a user's gesture within a predetermined distance (e.g., a predetermined space) of the electronic device 200. The first recognition camera 213 and/or the second recognition camera 223 may include a global shutter (GS) camera capable of reducing a rolling shutter (RS) phenomenon to detect and track the user's quick hand gestures and/or minute movements of the fingers. The electronic device 200 may detect an eye corresponding to the primary eye and/or the secondary eye among the user's left eye and/or right eye by using the first gaze tracking camera 205, the second gaze tracking camera 207, the first recognition camera 213, and/or the second recognition camera 223. For example, the electronic device 200 may detect the eye corresponding to the primary eye and/or the secondary eye based on the user's gaze direction with respect to an external object or a virtual object.

According to various embodiments, the first light-emitting device 217 and/or the second light-emitting device 227 may emit light to increase the accuracy of the camera module 203, the first gaze tracking camera 205, the second gaze tracking camera 207, the first recognition camera 213 and/or the second recognition camera 223. The first light-emitting device 217 and/or the second light-emitting device 227 may be used as an auxiliary means to increase accuracy when photographing the user's eyes by using the first gaze tracking camera 205 and/or the second gaze tracking camera 207. The first light-emitting device 217 and/or the second light-emitting device 227 may be used as an auxiliary means when the user's gesture is photographed by using the first recognition camera 213 and/or the second recognition camera 223 when it is difficult to detect an object (e.g., a subject) to be photographed due to a dark environment or mixed and reflected light of various light sources. The first light-emitting device 217 and/or the second light-emitting device 227 may include, for example, an LED, an IR LED, or a xenon lamp.

According to various embodiments, the first display module 219 and/or the second display module 229 may emit light and transmit the light to the user's left eye and/or right eye by using the first glass 215 and/or the second glass 225. The first glass 215 and/or the second glass 225 may display various image information by using light emitted through the first display module 219 and/or the second display module 229. The electronic device 200 may overlap and display a foreground of an external object and an image emitted through the first display module 219 and/or the second display module 229 through the first glass 215 and/or the second glass 225.

According to an embodiment, the first end piece 230 may be coupled to a part (e.g., the x-axis direction) of the first rim 210. The second end piece 240 may be coupled to a part (e.g., the −x-axis direction) of the second rim 220. In various embodiments, the first light-emitting device 217 and the first display module 219 may be included in the first end piece 230. The second light-emitting device 227 and the second display module 229 may be included in the second end piece 240.

According to various embodiments, the first end piece 230 may connect the first rim 210 and the first temple 250. The second end piece 240 may connect the second rim 220 and the second temple 260.

According to an embodiment, the first temple 250 may be operatively connected, directly or indirectly, to the first end piece 230 by using a first hinge part 255. The first hinge part 255 may be rotatably configured such that the first template 250 is folded or unfolded with respect to the first rim 210. The first temple/template 250 may extend, for example, along the left side of the user's head. For example, when the user wears the electronic device 200, the end part of the first temple/template 250 (e.g., in the y-axis direction) may be configured in a shape in which at least a part thereof is bent to be supported by at least a part of the user's left ear. The second temple 260 may be operatively connected, directly or indirectly, to the second end piece 240 by using a second hinge part 265. The second hinge part 265 may be rotatably configured such that the second temple/template 260 is folded or unfolded with respect to the second rim 220. The second temple/template 260 may extend, for example, along the right side of the user's head. For example, when the user wears the electronic device 200, the end part of the second temple/template 260 (e.g., in the y-axis direction) may be configured in a shape in which at least a part thereof is bent to be supported by at least a part of the user's right ear.

According to various embodiments, the first temple 250 may include a first printed circuit board 251, a first audio output module 253 (e.g., the audio output module 155 of FIG. 1), and/or a first battery 257 (e.g., the battery 189 of FIG. 1). The second temple/template 260 may include a second printed circuit board 261, a second sound output module 263 (e.g., the audio output module 155 of FIG. 1), and/or a second battery 267 (e.g., the battery 189 of FIG. 1).

According to various embodiments, various electronic components (e.g., at least some of the components included in the electronic device 101 of FIG. 1) such as the processor 120, the memory 130, the interface 177, and/or the wireless communication module 192 (comprising communication circuitry) illustrated in FIG. 1 may be disposed on the first printed circuit board 251 and/or the second printed circuit board 261. The processor may include, for example, one or more of a central processing unit, an application processor, a graphic processing unit, an image signal processor, a sensor hub processor, or a communication processor. The first printed circuit board 251 and/or the second printed circuit board 261 may include, for example, a printed circuit board (PCB), a flexible PCB (FPCB), or a rigid-flexible PCB (RFPCB). In some embodiments, the first printed circuit board 251 and/or the second printed circuit board 261 may include a primary PCB, a secondary PCB partially overlapping the primary PCB, and/or an interposer substrate between the primary PCB and the secondary PCB. The first printed circuit board 251 and/or the second printed circuit board 261 may be electrically connected, directly or indirectly, to other components (e.g., the camera module 203, the first gaze tracking camera 205, the second gaze tracking camera 207, the audio module 209, the first microphone 211, the first recognition camera 213, the first light-emitting device 217, the first display module 219, the second microphone 221, the second recognition camera 223, the second light-emitting device 227, the second display module 229, the first audio output module 253, and/or the second audio output module 263) by using an electrical path such as an FPCB and/or a cable. For example, the FPCB and/or the cable may be disposed on at least a part of the first rim 210, the bridge 201, and/or the second rim 220. In some embodiments, the electronic device 200 may include only one of the first printed circuit board 251 or the second printed circuit board 261.

According to various embodiments, the first audio output module 253 and/or the second audio output module 263 may deliver audio signals to the user's left and/or right ears. The first audio output module 253 and/or the second audio output module 263 may include, for example, a piezo speaker (e.g., a bone conduction speaker) that transmits audio signals without a speaker hole. In some embodiments, the electronic device 200 may include only one of the first audio output module 253 or the second audio output module 263.

According to various embodiments, the first battery 257 and/or the second battery 267 may supply power to the first printed circuit board 251 and/or the second printed circuit board 261 by using a power management module (e.g., the power management module 188 of FIG. 1). The first battery 257 and/or the second battery 267 may include, for example, a non-rechargeable primary battery, a rechargeable secondary battery, or a fuel cell. In some embodiments, the electronic device 200 may include only one of the first battery 257 or the second battery 267.

According to various embodiments, the electronic device 200 may include a sensor module (e.g., the sensor module 176 of FIG. 1, comprising at least one sensor). The sensor module may generate an electrical signal or data value corresponding to an internal operating state of the electronic device 200 or an external environmental state. The sensor module may further include, for example, at least one of a gesture sensor, a gyro sensor, a pressure sensor, a magnetic sensor, an acceleration sensor, a grip sensor, a color sensor, an infrared (IR) sensor, a biosensor (e.g., an HRM sensor), a temperature sensor, a humidity sensor, or an illuminance sensor. In some embodiments, the sensor module may recognize the user's biometric information by using various biosensors (or biometric sensors) such as an e-nose sensor, an electromyography (EMG) sensor, an electroencephalogram (EEG) sensor, an electrocardiogram (ECG) sensor, or an iris sensor.

Figure 3:
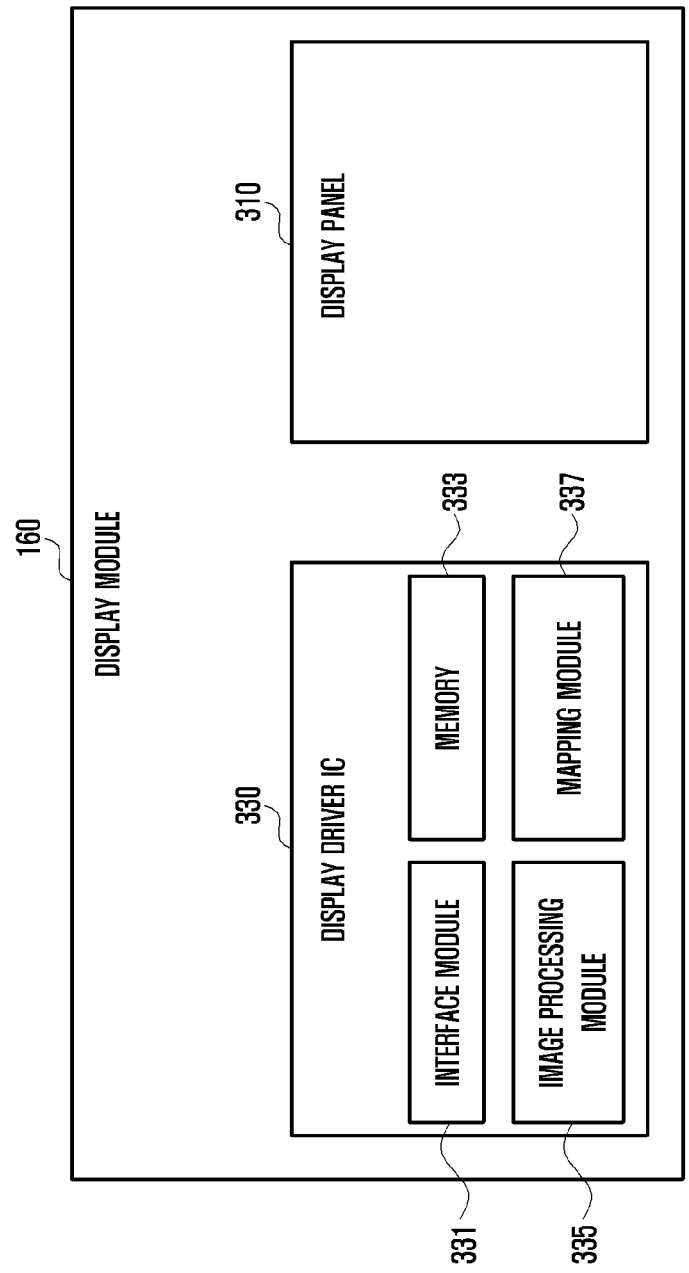
FIG. 3 is a block diagram of a display module according to various example embodiments.

FIG. 3 is a block diagram of a display module according to various embodiments.

Referring to FIG. 3, the display module 160 may include a display panel 310 and a display driver IC (DDI) 330 for controlling the display panel. The DDI 330 may include an interface module 331 comprising interface circuitry, a memory 333 (e.g., a buffer memory), an image processing module 335 comprising image processing circuitry, and/or a mapping module 337 comprising circuitry.

The DDI 330 may receive, for example, image data or image information including image control signals corresponding to commands for controlling the image data from other components of the electronic device 101 of FIG. 1 through the interface module 331. According to an embodiment, the image information may be received from the processor 120 of FIG. 1 (e.g., the main processor 121 (e.g., an application processor) or the auxiliary processor 123 (e.g., a graphic processing unit) that operates independently of the functions of the main processor 121). In addition, the DDI 330 may store at least a part of the received image information in the memory 333, for example, in units of frames. The image processing module 335 may pre-process or post-process (e.g., adjust resolution, brightness, or size), for example, at least a part of the image data based on characteristics of the image data or characteristics of the display panel 310. The mapping module 337 may generate a voltage value or a current value corresponding to the image data pre-processed or post-processed through the image processing module 335. According to an embodiment, generation of the voltage value or the current value may be performed, for example, based at least in part on the properties (e.g., an array of pixels (RGB stripe or pentile structure), or the size of each sub-pixel) of pixels of the display panel 310. At least some pixels of the display panel 310 may be driven at least partially based on of the voltage value or the current value, so that visual information (e.g., text, images, or icons) corresponding to the image data may be displayed through the display panel 310.

Figure 4:
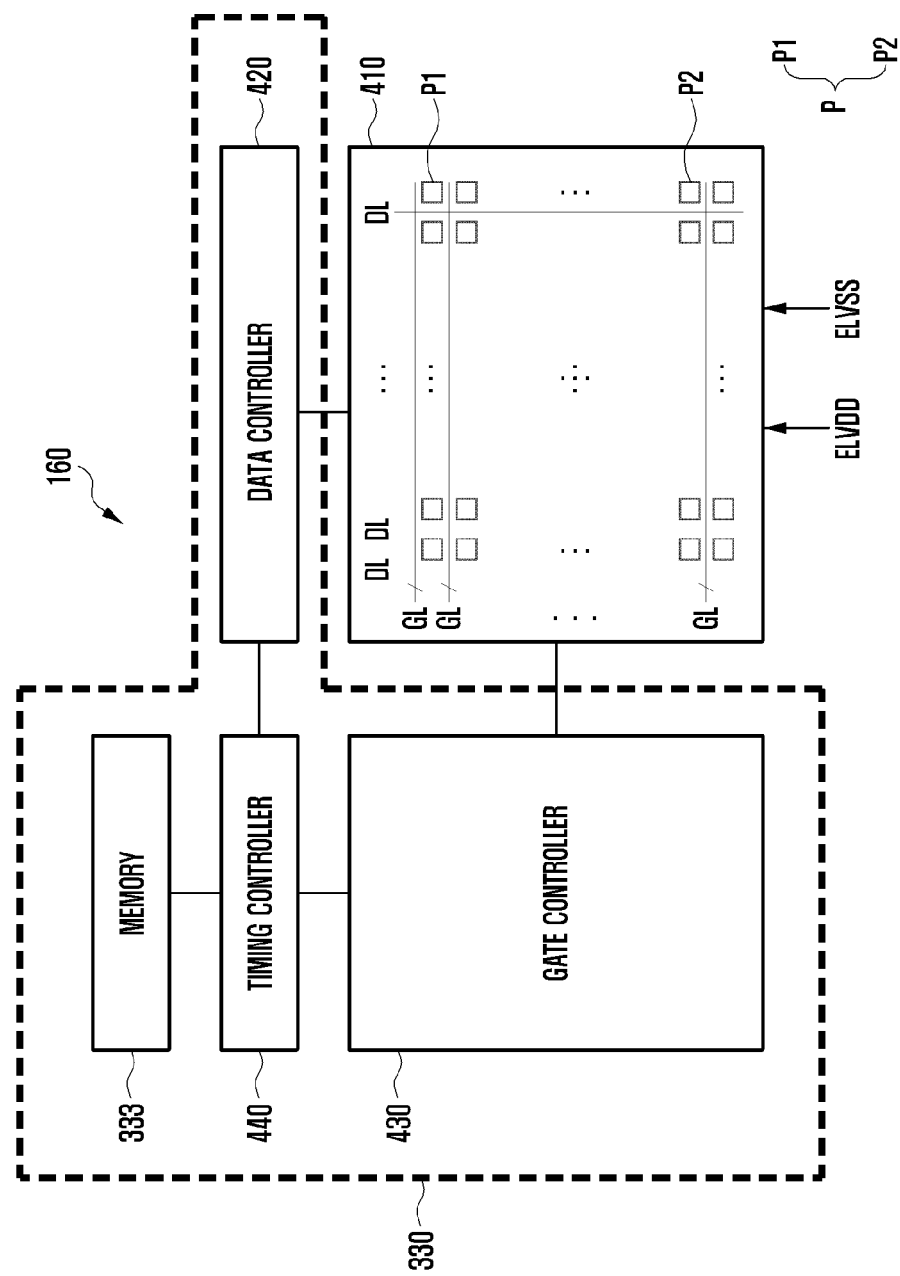
FIG. 4 is a block diagram of a display module according to various example embodiments.

FIG. 4 is a block diagram of a display module according to an embodiment.

The display module 160 illustrated in FIG. 4 may include the display module 160 illustrated in FIGS. 1 and/or 3.

Referring to FIG. 4, the display module 160 according to an embodiment may include a display panel 410, a data controller 420 comprising circuitry, a gate controller 430 comprising circuitry, a timing controller 440 comprising circuitry, and/or the memory 333 (e.g., the memory 333 of FIG. 3).

According to an embodiment, the DDI (e.g., DDI 330 of FIG. 3) may include the data controller 420, the gate controller 430, the timing controller 440, and/or the memory 333 (e.g., the memory 333 of FIG. 3).

According to various embodiments, at least a part of the data controller 420, the gate controller 430, the timing controller 440, and/or the memory 333 (e.g., the memory 333 of FIG. 3) may be included in the DDI 330 (e.g., DDI 330 of FIG. 3). According to an embodiment, the data controller 420, the timing controller 440, and/or the memory 333 (e.g., the memory 333 of FIG. 3) may be included in the DDI 330 (e.g., DDI 330 of FIG. 3). The gate controller 430 may be disposed in a non-display area of the display panel 410. According to an embodiment, the gate controller 430 may be referred to as a driving circuit.

According to an embodiment, the display panel 410 may include a plurality of gate lines GL and a plurality of data lines DL, and a pixel P may be disposed in each partial area of the display panel 410 where the plurality of gate lines GL and the plurality of data lines DL intersect.

According to an embodiment, pixels P may receive gate signals and light-emitting signals (e.g., EM signals) through gate lines GLs and data signals through data lines DLs. According to an embodiment, pixels P may receive a high potential voltage (e.g., an ELVDD voltage) and a low potential voltage (e.g., an ELVSS voltage) as power sources for driving organic light-emitting diodes (OLEDs).

According to an embodiment, each pixel P may include an OLED and a pixel circuit for driving the OLED. According to an embodiment, the pixel circuit disposed in each pixel P may control the on (e.g., active state) or off (e.g., inactive state) of the OLED based on the gate signal and the light-emitting signal (EM). According to an embodiment, when the OLED of each pixel P is turned on (e.g., activated), a grayscale (e.g., luminance) corresponding to the data signal may be displayed for one frame period.

According to an embodiment, the data controller 420 may drive a plurality of data lines DLs. According to an embodiment, the data controller 420 may receive at least one synchronization signal and a data signal (e.g., digital image data) from the timing controller 440 or the processor 120 (e.g., the processor 120 of FIG. 1). According to an embodiment, the data controller 420 may determine a data voltage (e.g., analog image data) corresponding to an input data signal by using a reference gamma voltage and a specified gamma curve. According to an embodiment, the data controller 420 may supply the data voltage to each pixel P by applying the data voltage to the plurality of data lines DLs.

According to an embodiment, the gate controller 430 may drive a plurality of gate lines GLs. According to an embodiment, the gate controller 430 may receive at least one synchronization signal from the timing controller 440 or the processor 120 (e.g., the processor 120 of FIG. 1). According to an embodiment, the gate controller 430 may sequentially generate a plurality of gate signals and sequentially generate a plurality of light-emitting signals (EM) based on the synchronization signal. The gate controller 430 may sequentially supply the generated gate signal and light-emitting signal (EM) to the first pixel P1 and the second pixel P2 through the gate lines GLs.

According to an embodiment, the timing controller 440 may control driving timings of the gate controller 430 and the data controller 420. According to an embodiment, the timing controller 440 may convert a data signal (e.g., digital image data) input from the processor 120 to correspond to the resolution of the display panel 410 and supply the converted data signal to the data controller 420.

Figure 5:
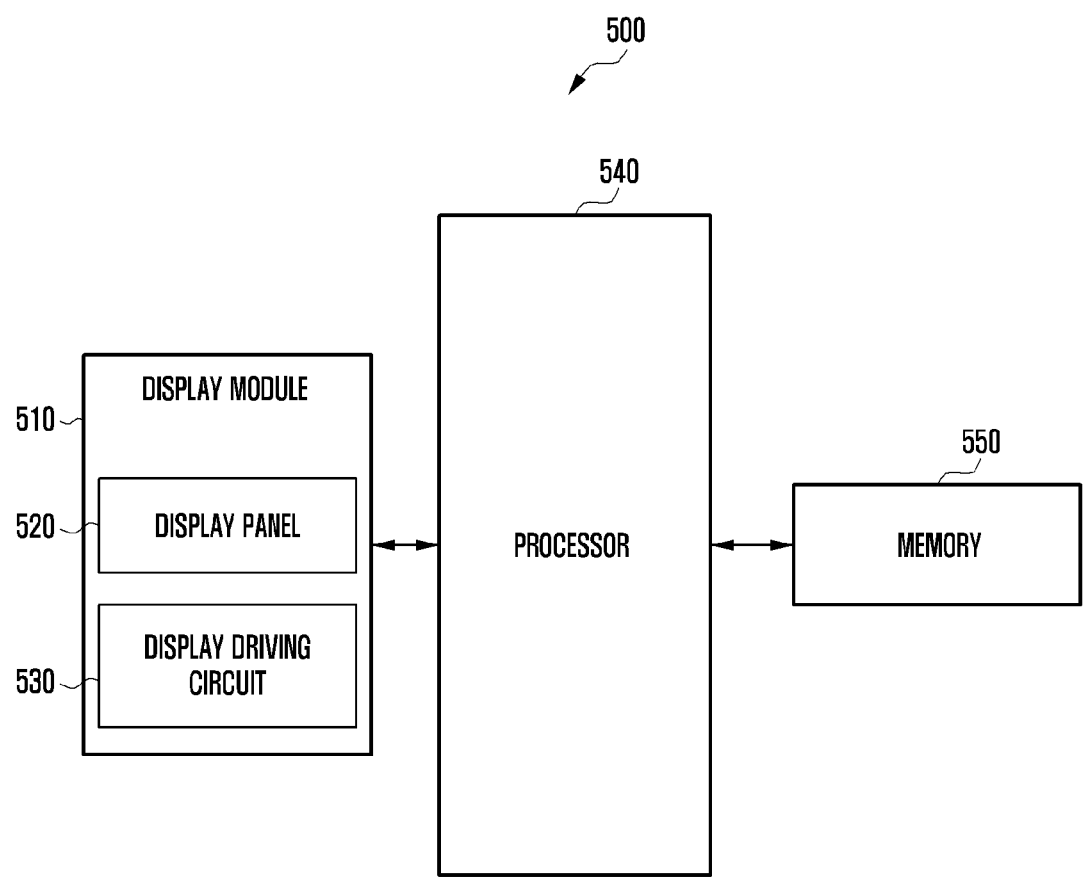
FIG. 5 is a block diagram of an electronic device according to various example embodiments.

FIG. 5 is a block diagram of an electronic device according to various example embodiments.

Referring to FIG. 5, an electronic device 500 according to various embodiments may include a display module 510, a processor 540, and a memory 550, and various example embodiments may be implemented even if some of the illustrated configurations are omitted or replaced. The electronic device 500 may be a wearable electronic device (e.g., the AR glasses 200 of FIG. 2) providing a VR or AR environment, but is not limited thereto. The electronic device 500 may further include at least a part of the configuration and/or functions of the electronic device 101 of FIG. 1.

According to various embodiments, the display module 510 may display image data provided from the processor 540. The display module 510 may include a display panel 520 and a display driving circuit 530. The display module 510 may be configured as an organic light-emitting diode (OLED) display, but is not limited thereto.

According to an embodiment, the display panel 520 may include a plurality of gate lines (e.g., gate lines (GLs) of FIG. 4) disposed in the horizontal direction and a plurality of data lines (e.g., data lines (DLs) of FIG. 4) disposed in the vertical direction, and each pixel (e.g., the pixel P of FIG. 4) may be disposed in the area where the gate line and the data line intersect. Each pixel may include an OLED and a pixel circuit for driving the OLED. According to an embodiment, the display panel 520 may include a plurality of pixel lines including pixels in the horizontal direction. Each pixel line may be connected through a gate line. A plurality of pixels included in each pixel line may emit light according to a light-emitting control signal of the display driving circuit 530, and the display driving circuit 530 may include a plurality of light-emitting circuits (or EM circuits) that output a light-emitting control signal to each pixel line.

According to an embodiment, the display driving circuit 530 may include at least some of the configuration and/or functions of the DDI 330 of FIG. 3 and/or the DDI 330 of FIG. 4. The display driving circuit 530 may include a data controller (e.g., the data controller 420 of FIG. 4) providing data signals to data lines, a gate controller (e.g., the gate controller 430 of FIG. 4) providing gate signals to gate lines, and a timing controller (e.g., the timing controller 440 of FIG. 4) controlling driving timings of the gate controller and data controller.

According to an embodiment, the display driving circuit 530 (e.g., a gate controller) may include a plurality of EM circuits that provide light-emitting control signals to a plurality of pixels in a row unit. The light-emitting control signal output from the display driving circuit 530 to each pixel may include at least one light-emitting duty. The light-emitting duty is a pulse-type signal, and a current is supplied to each pixel circuit during a light-emitting duty period so that the pixel may emit light.

According to various embodiments, the electronic device 500 may include a first display module (e.g., the first display module 219 of FIG. 2) for forming an image corresponding to the location of the user's left eye and a second display module (e.g., the second display module 229 of FIG. 2) for forming an image corresponding to the location of the user's right eye. For example, the light output from the first display module may be delivered through the optical system and then reflected by the first glass (e.g., the first glass 215 of FIG. 2) to be recognized by the user's left eye, and the light output from the second display module may be delivered through the optical system and then reflected by the second glass (e.g., the second glass 225 of FIG. 2) to be recognized by the user's right eye. The configuration and/or functions of the first display module and the second display module may be substantially the same, and the operation of the display module 510 described below may be the operation of the first display module and the second display module.

According to an embodiment, the first display module may include a first display panel and a first display driving circuit for emitting light from a plurality of pixels of the first display panel. The second display module may include a second display panel and a second display driving circuit for emitting light from a plurality of pixels of the second display panel. The configuration and/or functions of the first display driving circuit and the second display driving circuit may be substantially the same as the display driving circuit.

According to an embodiment, the first display module and the second display module may synchronize light-emitting activation signals (e.g., EM_STV) and clock signals (e.g., EM_CLK, EM_CLKB) for controlling light-emitting timing of the display panel. For example, the display panel of the first display module and the second display panel of the second display module may each include N pixel lines, and a first light-emitting circuit outputting a first light-emitting control signal to a specified pixel line (e.g., the N-th pixel line) of the first display module and a second light-emitting circuit outputting a second light-emitting control signal to a specified pixel line (e.g., the N-th pixel line) of the second display module may be electrically connected, directly or indirectly, to each other. Light-emitting duty timings of the first light-emitting control signal output from the first light-emitting circuit and the second light-emitting control signal output from the second light-emitting circuit may be configured to be synchronized with each other, so that specified pixel lines of the display panel of the first display module and the display panel of the second display module may emit light at substantially the same timing. In addition, the first light-emitting activation signal output from the first light-emitting circuit and the second light-emitting activation signal output from the second light-emitting circuit may be synchronized with each other, and the first clock signal output from the first light-emitting circuit and the second clock signal output from the second light-emitting circuit may be synchronized with each other. This embodiment will be described in detail with reference to FIG. 10.

According to various embodiments, the memory 550 may temporarily or permanently store various data including a volatile memory and a non-volatile memory. The memory 550 may include at least some of the configuration and/or functions of the memory 130 of FIG. 1 and may store the program 140 of FIG. 1. The memory 550 may store various instructions that may be executed by the processor 540. These instructions may include control commands such as arithmetic and logic operations, data movement, and input/output that may be recognized by the processor 540.

According to various embodiments, the processor 540 is a component capable of performing calculations or data processing related to control and/or communication of each component of the electronic device 500, and may be composed of one or more processors 540. The processor 540 may include at least some of the configuration and/or functions of the processor 120 of FIG. 1.

According to various embodiments, the processor 540 may provide image data generated by an application to the display module 510. The processor 540 and the display module 510 may transmit and receive data through a predetermined interface (e.g., MIPI). The processor 540 may render image data according to a predetermined rendering rate and provide the rendered image data to the display module 510. Here, the rendering rate may refer to the number of frames per second of image data rendered by the processor 540. The processor 540 may determine a rendering rate based on a user's configuration in an application and/or a property of a running application, and decrease the rendering rate in a low power mode for example.

According to various embodiments, the display driving circuit 530 may identify a driving frequency for displaying image data received from the processor 540 on the display panel 520. For example, the display driving circuit 530 may determine the driving frequency based on the rendering rate of image data received from the processor 540. Alternatively, the processor 540 may determine and transmit the driving frequency of an image to be output from the display module 510, and the display driving circuit 530 may operate according to the driving frequency received from the processor 540. When the driving frequency is N Hz, the display may display N frames per second on the display panel 520 and refresh frame data every 1/N second. The display driving circuit 530 may determine the driving frequency of the display based on the rendering rate of the image data received from the processor 540, and may operate at a lower or higher driving frequency than the rendering rate according to the performance of the display, the user's configuration, and/or the operating mode (e.g., a low power mode). For example, the display module 510 may operate at various driving frequencies such as 30 Hz, 60 Hz, 72 Hz, 80 Hz, 90 Hz, and 120 Hz.

According to various embodiments, the display driving circuit 530 may generate a light-emitting control signal for emitting light from at least some of a plurality of pixels of the display panel 520 based on the identified driving frequency. According to an embodiment, the light-emitting control signal may include at least one light-emitting period and at least one non-light-emitting period during one refresh cycle (or scanning period), and at least one light-emitting duty may be configured within each light-emitting period. For example, the display driving circuit 530 may configure a first time period from the data refresh timing of the first frame to a specified time point as the light-emitting period, and configure a second time period from a specified time point to the data refresh timing of the second frame as the non-light-emitting period. Alternatively, the display driving circuit 530 may configure one refresh cycle so that a plurality of light-emitting periods and non-light-emitting periods cross each other. According to an embodiment, the display driving circuit 530 may configure the entire first time period as one light-emitting duty, or may configure a plurality of light-emitting duties with short intervals within the first time period.

According to various embodiments, the display driving circuit 530 may configure the width and interval of the light-emitting duty based on the identified driving frequency. Flicker and motion blur issues may occur when the pixels of the display panel 520 emit light at predetermined time units. The flicker phenomenon may refer to a phenomenon in which a user perceives an image as flickering while the display panel 520 alternates between light-emitting and non-light-emitting. Because the flicker phenomenon may occur when the duration of the non-light-emitting period is long, the risk of flicker occurring during low-frequency driving may be greater than during high-frequency driving. The motion blur phenomenon may refer to a phenomenon in which a boundary of a moving object in an image is not clear and appears blurred. As will be described later with reference to FIG. 7, when the non-light-emitting period is configured to be short, the risk of motion blur occurring may be greater than when the non-light-emitting period is configured to be long. In a specific frequency band, flicker and motion blur may have a trade-off relationship, and various example embodiments, which will be described later, may provide a display driving method capable of reducing flicker and motion blur along with a seamless change in driving frequency when changing the display driving frequency.

According to various embodiments, the display driving circuit 530 may compare the identified driving frequency with a specified reference frequency, and form light-emitting control signals in different ways when the frequency is higher than or equal to the reference frequency and when the frequency is lower than the reference frequency. Here, the reference frequency may be 70 Hz, but is not limited thereto, and may be determined as a frequency with a low level of flicker possibility in consideration of afterimages of the human eye.

According to various embodiments, when the identified driving frequency is greater than or equal to the reference frequency, the display driving circuit 530 may configure at least one light-emitting duty for emitting light from a plurality of pixels within the first time period from data refresh timing during one refresh cycle, and configure the second time period from the first time period to the next data refresh timing as a non-light-emitting period in which the plurality of pixels do not emit light. According to an embodiment, the first time period may be shorter than the second time period, but may be equal to or longer than the second time period. According to an embodiment, in a state in which the driving frequencies are substantially the same, the lengths of the first time period and the second time period may be substantially equal in all refresh cycles. According to an embodiment, when the driving frequency is changed, the length of the first time period and the length of the second time period may increase or decrease in inverse proportion to the driving frequency.

The display driving circuit 530 may configure the light-emitting duty in the first time period according to the first embodiment or the second embodiment below.

According to the first embodiment, the display driving circuit 530 may configure the first time period as one light-emitting duty when the identified driving frequency is greater than or equal to a specified reference frequency (e.g., 70 Hz). When the identified driving frequency is less than the specified reference frequency (e.g., 70 Hz), the display driving circuit 530 may configure a plurality of light-emitting periods and non-light-emitting periods to cross during one refresh cycle. For example, the display driving circuit 530 may configure only one light-emitting duty for one refresh cycle when the driving frequency is greater than or equal to the reference frequency, and configure two or more light-emitting duties for one refresh cycle when the driving frequency is less than the reference frequency.

According to an embodiment, when the driving frequency is changed, the display driving circuit 530 may configure the length of the first time period based on the changed driving frequency. When the driving frequency is changed, the display driving circuit 530 may change the length of the first time period in inverse proportion to the ratio of the previous driving frequency to the changed driving frequency. For example, when the length of the first time period is A at the driving frequency of 120 Hz, the length of the first time period at 90 Hz may be determined by $A*120/90$, the length of the first time period at the driving frequency of 80 Hz may be determined by $A*120/80$, and the length of the first time period at the driving frequency of 72 Hz may be determined by $A*120/72$. The length of the first time period at the driving frequency of 120 Hz may be determined by $T_a-A$, the length of the second time period at 90 Hz may be determined by $T_b-A*120/90$, the length of the second time period at the driving frequency of 80 Hz may be determined by $T_c-A*120/80$, and the length of the second time period at the driving frequency of 72 Hz may be determined by $T_d-A*120/72$. Here, $T_a$, $T_b$, $T_c$, and $T_d$ may be the time of one refresh cycle when the driving frequencies are 120 Hz, 90 Hz, 80 Hz, and 72 Hz, respectively. In the embodiment, the time width of the light-emitting duty may be substantially the same as that of the first time period, and accordingly, the time width of the light-emitting duty may also be in inverse proportion to the driving frequency.

According to an example embodiment, because the time for emitting light within the same time between driving frequencies is substantially the same, the magnitude of the luminance may be configured to be substantially the same even if the driving frequency is changed. In addition, when driving at a low frequency below the reference frequency, the light-emitting duty may be evenly configured to two or more to improve the flicker, and because the flicker risk is low when driving at a high frequency above the reference frequency, the entire light-emitting period may be composed of one light-emitting duty, and the non-light-emitting period may be driven long back, thereby improving motion blur.

The first embodiment will be described in more detail with reference to FIGS. 8A and 8B.

According to the second embodiment, when the identified driving frequency is greater than or equal to the specified reference frequency, the display driving circuit 530 may configure a plurality of light-emitting duties during the first time period from the data refresh timing to a specified time point. Unlike the first embodiment, in the second embodiment, instead of one light-emitting duty in the light-emitting period (or the first time period), a plurality of light-emitting duties having a small time width may be collected and configured as the light-emitting period. When driving at a high frequency above the reference frequency, a plurality of light-emitting duties may be gathered to form a light-emitting period, and one refresh cycle may be composed of a light-emitting period including a plurality of light-emitting duties and a non-light-emitting period in which no light-emitting duty is configured.

According to an embodiment, the widths and intervals of the plurality of light-emitting duties configured in the first time period may be substantially equal to each other. This is to adjust the luminance difference according to the intersection of light-emitting and non-light-emitting when the driving frequency is changed.

According to an embodiment, when the driving frequency is changed, the display driving circuit 530 may determine the number of light-emitting duties configured in the first time period based on the changed driving frequency. For example, when the driving frequency is 120 Hz, 6 light-emitting duties may be configured during the first time period which is a light-emitting period, when the driving frequency is 90 Hz, 8 light-emitting duties may be configured during the first time period which is a light-emitting period, and when the driving frequency is 80 Hz, 9 light-emitting duties may be configured during the first time period which is a light-emitting period. Here, the length of the first time period at each driving frequency may be proportional to the number of light-emitting duties. According to an embodiment, the display driving circuit 530 may maintain the width and interval of each light-emitting duty substantially the same even if the driving frequency is changed.

According to an embodiment, when the identified driving frequency is less than the specified reference frequency, the display driving circuit 530 may configure a plurality of light-emitting periods including a plurality of light-emitting duties and non-light-emitting periods in which no light-emitting duty is configured, so that the light-emitting periods and non-light-emitting periods intersect each other. According to another embodiment, when the identified driving frequency is less than the specified reference frequency, the display driving circuit 530 may configure the light-emitting duty at uniform intervals without distinguishing between the light-emitting period and the non-light-emitting period for the entire refresh cycle.

The second embodiment will be described in more detail with reference to FIGS. 9A to 9C.

Figure 6:
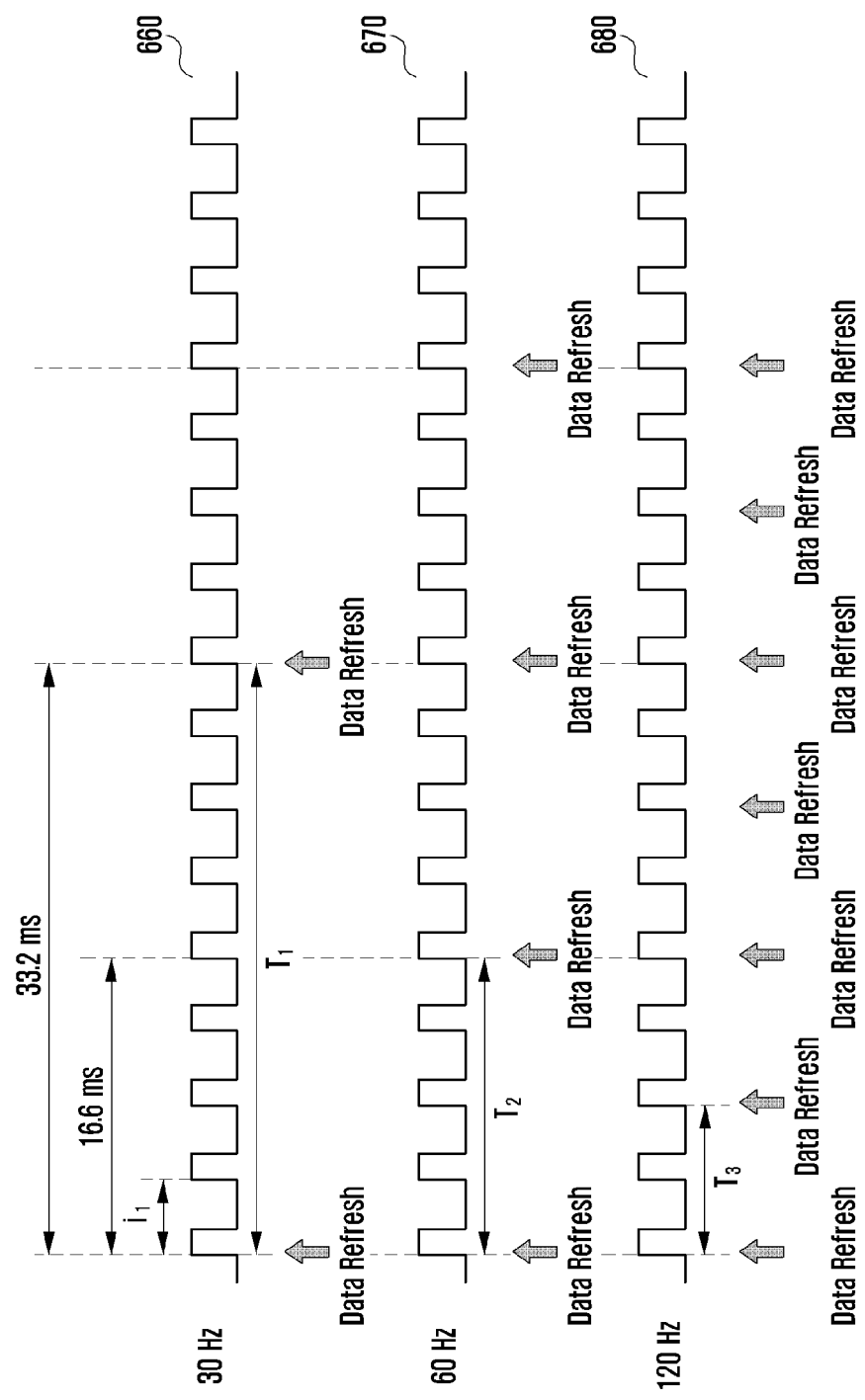
FIG. 6 illustrates a light-emitting timing when a display driving frequency is changed according to a comparative example.

FIG. 6 illustrates a light-emitting timing when a display driving frequency is changed according to a comparative example.

An electronic device (e.g., the electronic device 500 of FIG. 5) providing a VR or AR function may drive a display at a driving frequency higher than a high frequency (e.g., 90 Hz) to increase the response speed of the display (e.g., the display module 510 of FIG. 5), and accordingly, a processor (e.g., the processor 540 of FIG. 5) may render image data at high speed. Accordingly, a heating issue may occur in the entire electronic device. The electronic device may apply a technology for varying a display driving frequency when heat is generated and/or when power is low.

FIG. 6 is a comparative example of various example embodiments and illustrates an example in which an electronic device maintains substantially the same width and number of light-emitting duties even when a driving frequency of a display is changed.

Referring to FIG. 6, the electronic device may drive the display at frequencies of 30 Hz, 60 Hz, and 120 Hz. When the driving frequency is 30 Hz 660, the electronic device may refresh image data at a period of T1 (about 33.2 ms), when the driving frequency is 60 Hz 670, the electronic device may refresh image data at a period of T2 (about 16.6 ms), and when the driving frequency is 120 Hz 680, the electronic device may refresh image data at a period of T3 (about 8.3 ms).

As illustrated in FIG. 6, the electronic device may configure the width and number of light-emitting duties substantially the same within the same time, even if the display driving frequencies are different from each other such as 30 Hz, 60 Hz, and 120 Hz. For example, when the display is driven at 120 Hz, 60 Hz, and 30 Hz, the electronic device may drive the display with 2, 4, and 8 light-emitting duties, respectively, during one data refresh cycle, and the width of the light-emitting duty at each driving frequency is configured to be substantially the same, so that the light-emitting timing of the display may be configured substantially the same even if the driving frequency is changed.

Luminance deviation may occur as the pulse of the light-emitting duty repeats on/off, but as illustrated in FIG. 6, when the width and the number of light-emitting duties are configured substantially the same even when the driving frequency is changed, there is no luminance deviation despite the driving frequency change, and thus a seamless frequency change may be implemented.

In the case of using the driving frequency variable technology as in this comparative example, there is an effect of reducing the occurrence of flickers even when operating at a low frequency (e.g., 70H or less), but motion blur (or screen dragging) may occur when operating at a high frequency.

FIG. 7 illustrates a motion blur phenomenon occurring according to a display light-emitting timing according to a comparative example.

Motion blur is a phenomenon in which the boundary of a moving object in an image is not clear and appears blurred, and may occur due to an afterimage phenomenon caused by the response speed of a display and/or characteristics of the human eye. In FIG. 7, each row represents frames 1, 2, and 3, each column represents pixel data of pixels p1 to p8 of each frame, and the black area may refer to a light-emitting period, and the white area may refer to a non-light-emitting period.

Figure 7A:
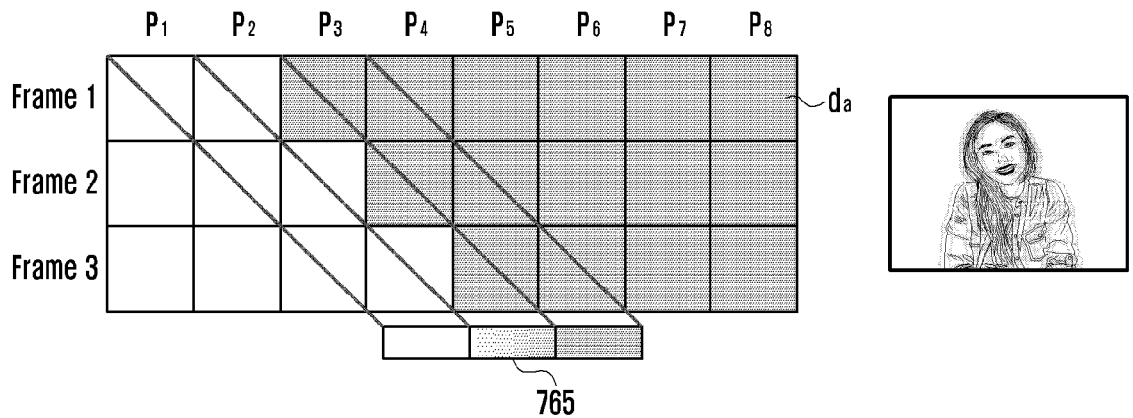
FIGS. 7A, 7B, and 7C illustrate a motion blur phenomenon occurring according to a light-emitting timing of a display according to a comparative example.

FIG. 7(a) illustrates a case where the electronic device drives the entire one frame period with one duty. As illustrated, the electronic device may drive pixels p3 to p8 with one light-emitting duty d a during the frame period (e.g., from the data refresh timing of the frame 1 to just before the data refresh timing of the frame 2) of the frame 1. In addition, the electronic device may drive pixels p4 to p8 with one light-emitting duty during the frame period (e.g., from the data refresh timing of the frame 2 to just before the data refresh timing of the frame 3) of the frame 2, and drive pixels p5 to p8 with one light-emitting duty during the frame period (e.g., from the data refresh timing of the frame 3 to just before the data refresh timing of the frame 4 (not illustrated)) of the frame 3. In this way, when pixels emit light during the entire frame period, motion blur may occur in the edge area 765 of the image.

Figure 7B:
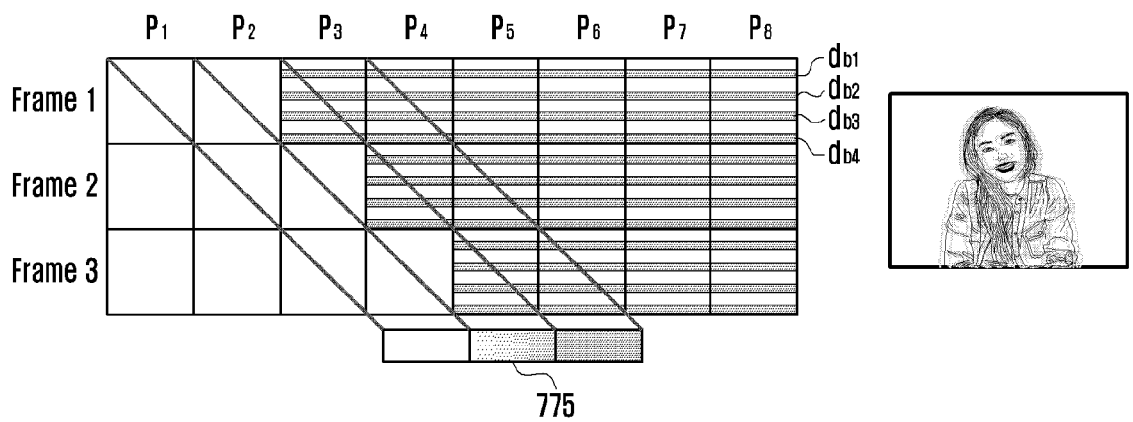

FIG. 7(b) illustrates a case where the electronic device drives one frame period with four duties. As illustrated, the electronic device may drive pixels p3 to p8 with four light-emitting duties, $db_1$, $db_2$, $db_3$, and $db_4$, during the frame period of the frame 1. Here, the four light-emitting duties, $db_1$, $db_2$, $db_3$, and $db_4$, may have substantially the same interval, and the width (or light-emitting time) of the light-emitting duties, $db_1$, $db_2$, $db_3$, and $db_4$, may be substantially the same. In addition, the electronic device may drive pixels with equal four light-emitting duties during the frame period of the frame 2, and drive pixels with equal four light-emitting duties during the frame period of the frame 3. In this way, even when the display is driven with a plurality of light-emitting duties having equal periods during one frame period, motion blur occurring in the edge area 775 of the image may not be significantly different, as illustrated in FIG. 7(a).

Figure 7C:
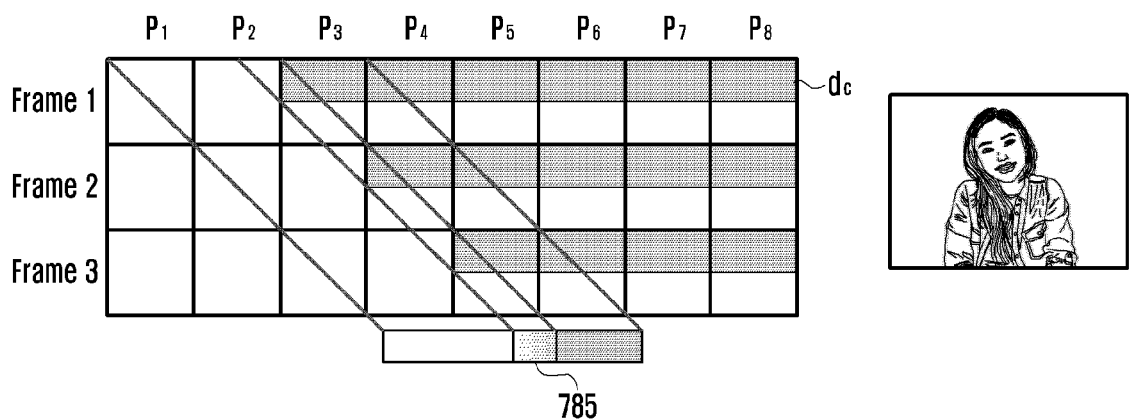

FIG. 7(c) illustrates a case where the electronic device drives one frame period with one duty but configures some periods as black insertion periods. As illustrated, the electronic device may configure a light-emitting duty $d_c$ having a predetermined width from the data refresh timing in the frame period of the frame 1, and configure a period before the next data refresh timing as a non-light-emitting period (or black period). In addition, the electronic device may configure a light-emitting duty having a predetermined width from the data refresh timing of the frame 2, and configure a period before the next data refresh timing as a non-light-emitting period, and configure a light-emitting duty having a predetermined width from the data refresh timing of the frame 3, and configure a period before the next data refresh timing as a non-light-emitting period.

As illustrated in FIG. 7(c), when the light-emitting duty is collected shortly and a non-light-emitting period is inserted for a subsequent time, the area where the afterimage occurs is narrowed, so that motion blur may be improved in the edge area 785 of the image.

Figure 8A:
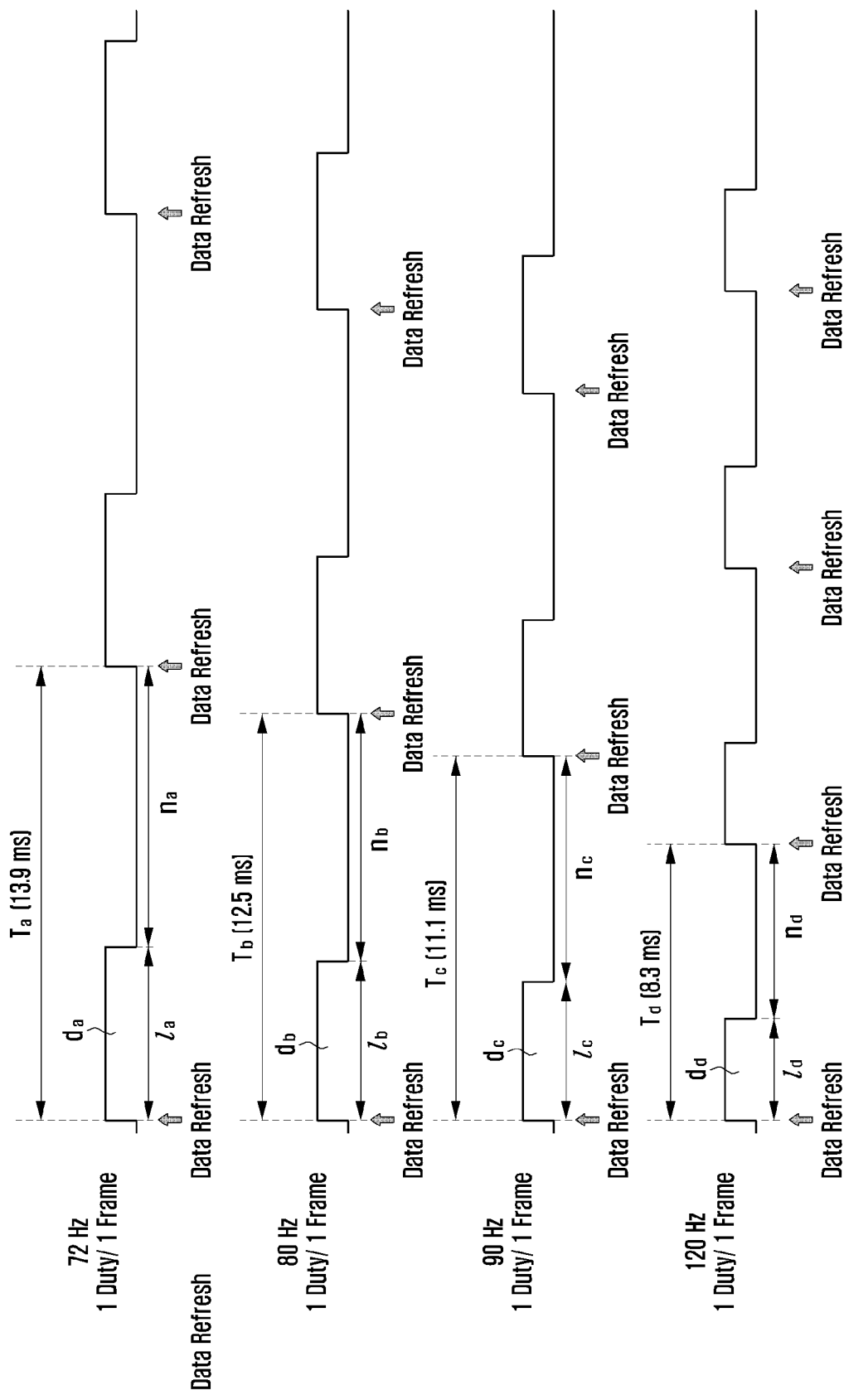
FIGS. 8A and 8B illustrate light-emitting timings when a display driving frequency is changed according to an example embodiment.
Figure 8B:
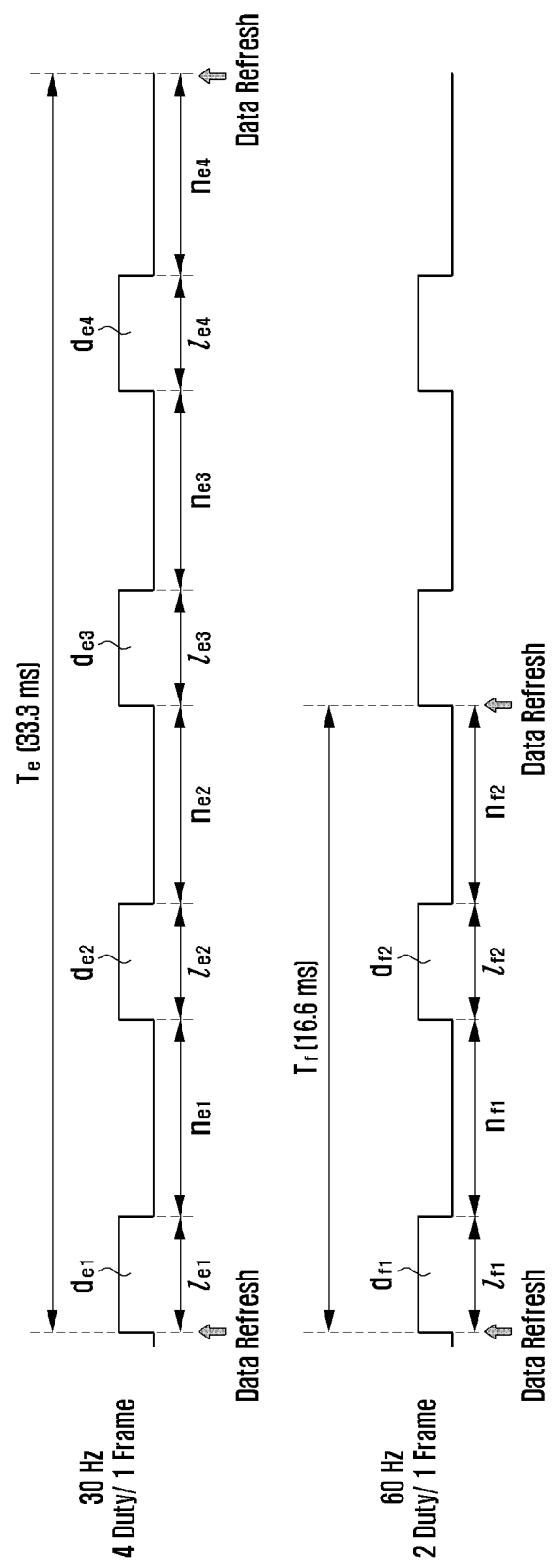

FIGS. 8A and 8B illustrate light-emitting timings when a display driving frequency is changed according to the first embodiment among various example embodiments.

FIGS. 8A and 8B illustrate a first embodiment of a light-emitting control signal output from a light-emitting circuit of a display driving circuit (e.g., the display driving circuit 530 of FIG. 5) corresponding to a specific pixel line among a plurality of pixel lines included in a display panel (e.g., the display panel 520 of FIG. 5).

According to various embodiments, when a driving frequency for displaying image data on the display panel (e.g., the display panel 520 of FIG. 5) is greater than or equal to a reference frequency, the display driving circuit (e.g., the display driving circuit 530 of FIG. 5) may configure at least one light-emitting duty for emitting light from a plurality of pixels of the pixel line within the first time period from a data refresh timing to a specified time point in one refresh cycle, and configure the second time period from the specified time point to the next data refresh timing as a non-light-emitting period in which the plurality of pixels of the pixel line do not emit light. Here, the specified time point may be changed according to the driving frequency, and for example, the lengths of the first time period and the second time period may be substantially inversely proportional to the driving frequency, respectively.

According to an embodiment, the display driving circuit may determine the first time period as one light-emitting duty when the driving frequency is greater than or equal to the reference frequency (e.g., 70 Hz).

FIG. 8A illustrates an example of a light-emitting control signal when the driving frequency is greater than or equal to the reference frequency (e.g., 70 Hz) in the first embodiment.

Referring to FIG. 8A, when the driving frequency is 72 Hz, the refresh period $T_a$ may be about 13.9 ms. According to an embodiment, the display driving circuit may configure the entire first time period $l_a$, which is a light-emitting period, as one pixel duty, and configure the entire second time period $n_a$ after the first time period $l_a$ in the refresh period $T_a$ as a non-light-emitting period. For example, when the length of the first time period $l_a$ is A, the length of the second time period $n_a$ may be determined as $T_a$−A.

Referring to FIG. 8A, when the driving frequency is 80 Hz, the refresh period $T_b$ may be about 12.5 ms. According to an embodiment, the display driving circuit may configure the entire first time period $l_b$, which is a light-emitting period, as one light-emitting duty, and configure the entire second time period $n_b$ after the first time period $l_b$ in the refresh period $T_b$ as a non-light-emitting period without a light-emitting duty.

Referring to FIG. 8A, when the driving frequency is 90 Hz, the refresh period $T_c$ may be about 11.1 ms. According to an embodiment, the display driving circuit may configure the entire first time period $l_c$, which is a light-emitting period, as one light-emitting duty, and configure the entire second time period $n_c$ after the first time period $l_c$ in the refresh period $T_c$ as a non-light-emitting period.

Referring to FIG. 8A, when the driving frequency is 120 Hz, the refresh period $T_d$ may be about 8.3 ms. According to an embodiment, the display driving circuit may configure the entire first time period $l_c$, which is a light-emitting period, as one light-emitting duty, and configure the entire second time period $n_c$ after the first time period $l_d$ in the refresh period $T_d$ as a non-light-emitting period.

According to an embodiment, when the driving frequency is changed, the display driving circuit may configure the length of the first time period, which is a light-emitting period, in inverse proportion to the driving frequency. Because the entire first time period is configured to one light-emitting duty, the duration of the light-emitting duty may also be in inverse proportion to the driving frequency. For example, when the length of the first time period is A at the driving frequency of 120 Hz, the length of the first time period at 90 Hz may be determined as A*120/90, and the length of the second time period may be determined as $T_b$−(A*120/90). In addition, at the driving frequency of 80 Hz, the length of the first time period may be determined as A*120/80, the length of the second time period may be determined as $T_c$–(A*120/80), and at the driving frequency of 72 Hz, the length of the first time period may be determined as A*120/72, the length of the second time period may be determined as $T_d$–(A*120/72).

According to various example embodiments, the magnitude of luminance emitted within the same time at each driving frequency may be configured to be substantially the same. As in various example embodiments, even if one light-emitting duty is configured per refresh period, the flicker risk is relatively not greater at high frequencies above the reference frequency than at low frequencies, and because the non-light-emitting period is formed for a specified time after the light-emitting period, motion blur may also be improved by generating a black insertion effect.

According to an embodiment, the display driving circuit may configure a plurality of light-emitting periods and non-light-emitting periods to intersect when the driving frequency is less than the reference frequency.

FIG. 8B illustrates an example of a light-emitting control signal when the driving frequency is less than the reference frequency (e.g., 70 Hz) in the first embodiment.

Referring to FIG. 8B, when the driving frequency is 30 Hz, the refresh period $T_e$ may be about 33.3 ms. According to an embodiment, the display driving circuit may configure four light-emitting duties $d_{e1}$, $d_{e2}$, $d_{e3}$, and $d_{e4}$ during one refresh cycle $T_e$. Accordingly, the light-emitting periods $l_{e1}$, $l_{e2}$, $l_{e3}$, and $l_{e4}$ and the non-light-emitting periods $n_{e1}$, $n_{e2}$, $n_{e3}$, and $n_{e4}$ may be configured to cross each other.

Referring to FIG. 8B, when the driving frequency is 60 Hz, the refresh period $T_f$ may be about 16.6 ms. According to an embodiment, the display driving circuit may configure two light-emitting duties $d_{f1}$ and $d_{f2}$ during one refresh cycle $T_f$. Accordingly, the light-emitting periods $l_{f1}$ and $l_{f2}$ and the non-light-emitting periods $n_{f1}$ and $n_{f2}$ may be configured to cross each other.

According to an embodiment, when the driving frequency is less than the reference frequency, the width of the light-emitting duty and the interval between the light-emitting duties may be equally configured at each driving frequency, and the number of light-emitting duties may be in inverse proportion to the driving frequency. For example, when the driving frequency is 30 Hz, four light-emitting duties may be configured during one refresh cycle, and when the driving frequency is 60 Hz, two light-emitting duties of substantially the same width may be configured at substantially the same interval for one refresh cycle.

According to various example embodiments, in the case of operating at a low frequency less than the reference frequency, unlike a high-frequency case in which a single light-emitting duty is operated per cycle, a plurality of light-emitting duties may be configured, and accordingly, flicker may be improved even in low-frequency operation.

Figure 9A:
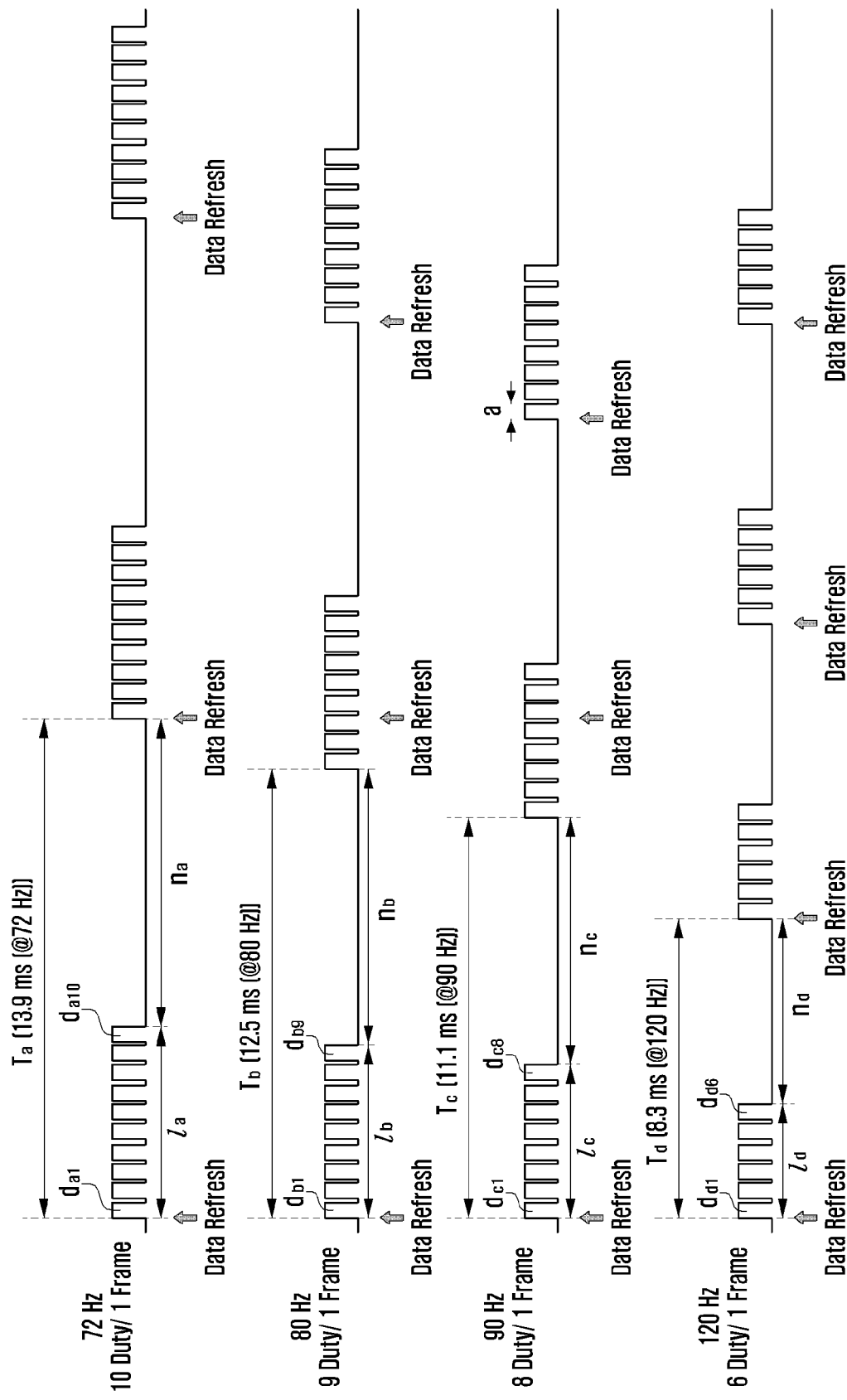
FIGS. 9A, 9B, and 9C illustrate light-emitting timings when a display driving frequency is changed according to an example embodiment.
Figure 9B:
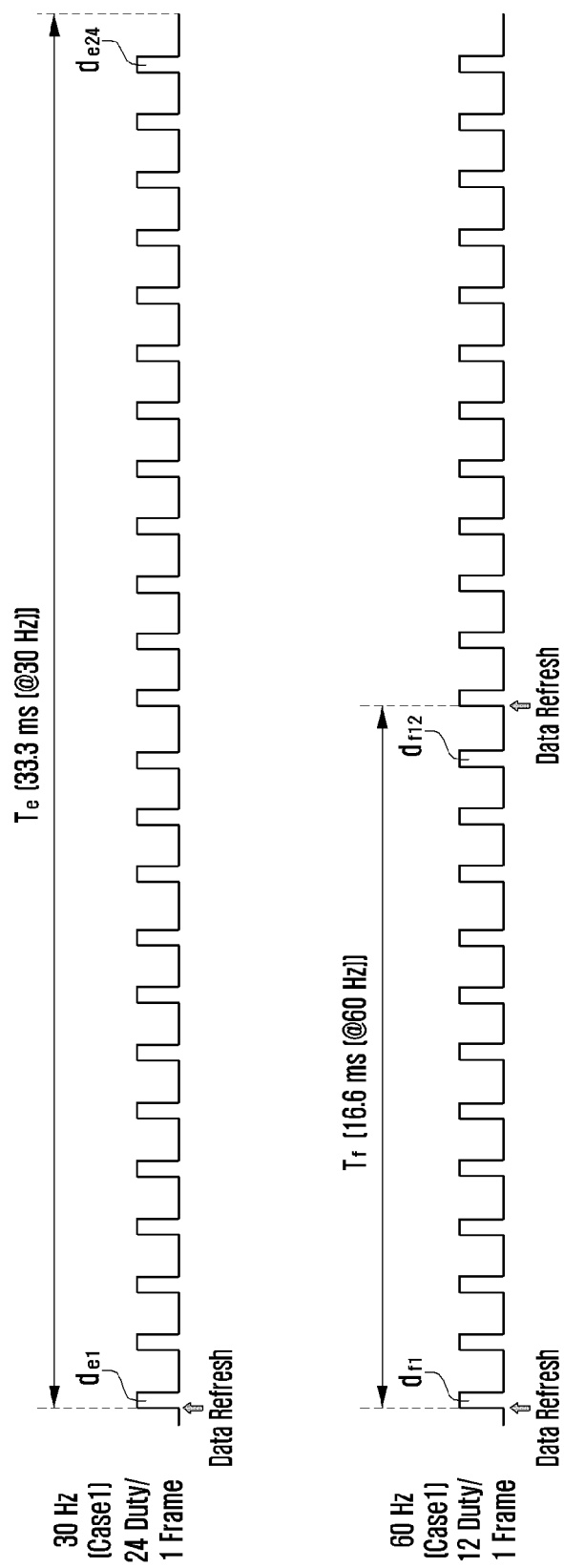
Figure 9C:
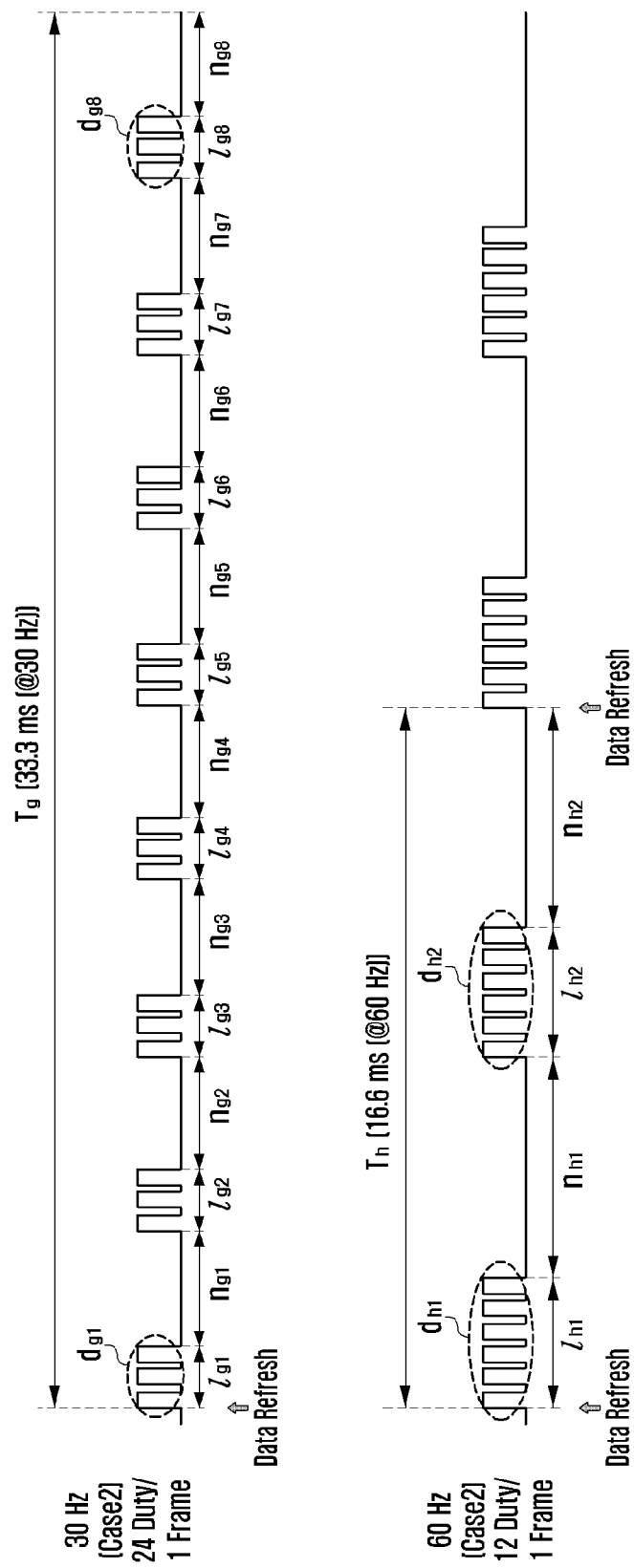

FIGS. 9A, 9B and 9C illustrate light-emitting timings when a display driving frequency is changed according to the first embodiment among various example embodiments.

FIGS. 9A, 9B and 9C illustrate a second embodiment of a light-emitting control signal output from a light-emitting circuit of a display driving circuit (e.g., the display driving circuit 530 of FIG. 5) corresponding to a specific pixel line among a plurality of pixel lines included in a display panel (e.g., the display panel 520 of FIG. 5).

According to an embodiment, when a driving frequency for displaying image data on the display panel (e.g., the display panel 520 of FIG. 5) is greater than or equal to a reference frequency, the display driving circuit (e.g., the display driving circuit 530 of FIG. 5) may configure, for each pixel line, a plurality of light-emitting duties for emitting light from a plurality of pixels of the pixel line within the first time period from a data refresh timing to a specified time point in one refresh cycle, and configure the second time period from the specified time point to the next data refresh timing as a non-light-emitting period in which the plurality of pixels of the pixel line do not emit light.

According to an embodiment, the display driving circuit may configure the length of the first time period, which is the light-emitting period, in inverse proportion to the driving frequency when the driving frequency is changed above the reference frequency, and determine the number of light-emitting duties corresponding to the length of the first time period. In this case, even if the driving frequency changes, the width and interval of the light-emitting duty may be configured substantially the same as each other, but the width and interval of the light-emitting duty may be partially different at a specific frequency that is not proportional.

FIG. 9A illustrates an example of a light-emitting control signal when the driving frequency is greater than or equal to the reference frequency (e.g., 70 Hz) in the second embodiment.

Referring to FIG. 9A, when the driving frequency is 72 Hz, the refresh period $T_a$ may be about 13.9 ms. According to an embodiment, the display driving circuit may configure ten light-emitting duties $d_{a1}$ to $d_{a10}$ with substantially the same width and interval in the first time interval $l_a$, which is a light-emitting period, for each pixel line, and configure the entire second time period n a after the first time period $l_a$ in the refresh period $T_a$ as a non-light-emitting period.

Referring to FIG. 9A, when the driving frequency is 80 Hz, the refresh period $T_b$ may be about 12.5 ms. According to an embodiment, the display driving circuit may configure nine light-emitting duties $d_{b1}$ to $d_{b9}$ with substantially the same width and interval in the first time interval $l_b$, which is a light-emitting period, for each pixel line, and configure the entire second time period $n_b$ after the first time period $l_b$ in the refresh period $T_b$ as a non-light-emitting period.

Referring to FIG. 9A, when the driving frequency is 90 Hz, the refresh period $T_c$ may be about 11.1 ms. According to an embodiment, the display driving circuit may configure eight light-emitting duties $d_{c1}$ to $d_{c8}$ with substantially the same width and interval in the first time interval $l_c$, which is a light-emitting period, for each pixel line, and configure the entire second time period $n_c$ after the first time period $l_c$ in the refresh period $T_c$ as a non-light-emitting period.

Referring to FIG. 9A, when the driving frequency is 120 Hz, the refresh period $T_d$ may be about 8.3 ms. According to an embodiment, the display driving circuit may configure six light-emitting duties $d_{d1}$ to $d_{d6}$ with substantially the same width and interval in the first time interval $l_d$, which is a light-emitting period, for each pixel line, and configure the entire second time period n d after the first time period $l_d$ in the refresh period $T_d$ as a non-light-emitting period.

According to various example embodiments, when the driving frequency is greater than or equal to the reference frequency, the light-emitting period and the non-light-emitting period may be collected and driven, respectively, and compared to the first embodiment of FIGS. 8A and 8B, a plurality of small duties may be gathered instead of one duty to configure a light-emitting period. According to various example embodiments, the number of light-emitting duties relative to time may be the same at each driving frequency. In this way, as the number of light-emitting duties is configured to be the same for each driving frequency, the difference in luminance between the light-emitting period and the non-light-emitting period may be substantially the same for each driving frequency. In addition, because the non-light-emitting period is formed for a specified time after the light-emitting period, motion blur may be improved by generating a black insertion effect.

According to various embodiments, when a light-emitting control signal is input from the light-emitting circuit for a specific pixel line of the display panel, a plurality of pixels included in the corresponding pixel line may emit light during a period in which a light-emitting duty is configured. For example, pixel circuits corresponding to each pixel may include a driving TFT that controls the amount of driving current flowing through the OLED and a light-emitting TFT that turns on/off the inflow of driving current into the OLED. The light-emitting TFT is turned on during the light-emitting duty period of the light-emitting control signal so that the driving current flows through the OLED, allowing the OLED to emit light.

Referring to FIG. 9A, the light-emitting period of the light-emitting control signal may be configured to a plurality of light-emitting duties, and compared to configuring the entire light-emitting period to one light-emitting duty and distinguishing the actual light-emitting timing through PWM control, the light-emitting timing of the pixel may be configured relatively accurately.

FIGS. 9B and 9C illustrate examples of light-emitting control signals when the driving frequency is less than the reference frequency (e.g., 70 Hz) in the second embodiment.

According to an embodiment, when the driving frequency is less than the reference frequency, the display driving circuit may equally configure a plurality of light-emitting duties. In this case, even at different driving frequencies, the width and interval of each light-emitting duty may be substantially the same.

Referring to FIG. 9B, when the driving frequency is 30 Hz, the refresh period $T_e$ may be about 33.3 ms. The display driving circuit may configure 24 light-emitting duties $d_{e1}$ to $d_{e24}$ at equal intervals (e.g., about 1.38 ms) during refresh period $T_e$.

Referring to FIG. 9B, when the driving frequency is 60 Hz, the refresh period $T_f$ may be about 16.6 ms. The display driving circuit may configure 12 light-emitting duties $d_{f1}$ to $d_{f12}$ at equal intervals (e.g., about 1.38 ms) during refresh period $T_f$.

According to an embodiment, when the driving frequency is less than the reference frequency, the display driving circuit may configure a plurality of light-emitting periods and non-light-emitting periods to cross each other, and configure a plurality of light-emitting duties at equal intervals in each light-emitting period. According to an embodiment, the display driving circuit may configure the length of the light-emitting period in inverse proportion to the driving frequency. In addition, by configuring substantially the same width and interval of light-emitting duty at each driving frequency, the number of light-emitting duties configured in one light-emitting period at each driving frequency may be in inverse proportion to the driving frequency.

Referring to FIG. 9C, when the driving frequency is 30 Hz, the refresh period $T_g$ may be about 33.3 ms. The display driving circuit may configure one refresh cycle to 8 light-emitting periods $l_{g1}$ to $l_{g8}$ and 8 non-light-emitting periods $n_{g1}$ to $n_{g8}$ configured after each light-emitting period. In this case, the number of light-emitting duties $d_{g1}$ configured in the first light-emitting period $l_{g1}$ may be configured to 3, and the number of light-emitting duties of the second to eighth light-emitting periods $l_{g2}$ to $l_{g8}$ may be the same as 3.

Referring to FIG. 9C, when the driving frequency is 60 Hz, the refresh period $T_h$ may be about 16.6 ms. The display driving circuit may configure one refresh cycle to 2 light-emitting periods $l_{h1}$ to $l_{h2}$ and 2 non-light-emitting periods $n_{h1}$ to $n_{h2}$ configured after each light-emitting period. In this case, the number of light-emitting duties $d_{h1}$ configured in the first light-emitting period $l_{h1}$ and the number of light-emitting duties $d_{h2}$ configured in the second light-emitting period $l_{h2}$ may be configured to 6, which is twice as high as when driving at 30 Hz.

Figure 10:
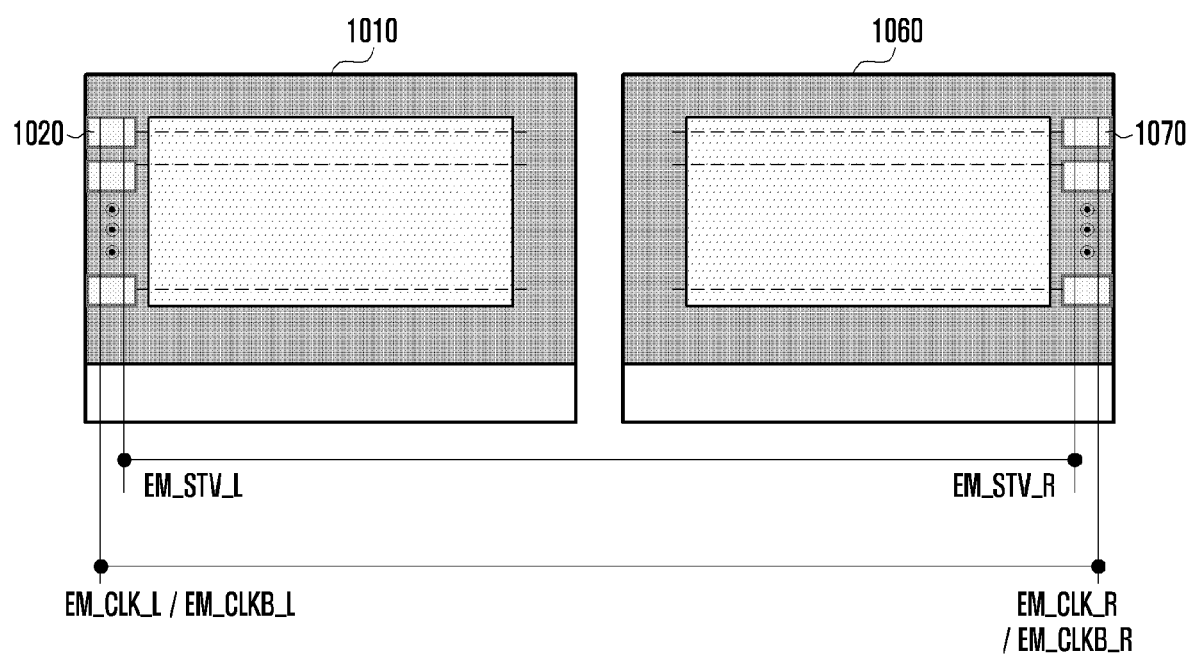
FIG. 10 is a circuit diagram for synchronizing light-emitting timings of a left-eye display and a right-eye display according to various example embodiments of the display.

FIG. 10 is a circuit diagram for synchronizing light-emitting timing of a left-eye display and a right-eye display according to various embodiments of the display.

According to various embodiments, the electronic device (e.g., the electronic device 500 of FIG. 5) may include a first display module 1010 (e.g., the first display module 219 of FIG. 2) for forming an image corresponding to the location of the user's left eye and a second display module 1060 (e.g., the second display module 229 of FIG. 2) for forming an image corresponding to the location of the user's right eye. For example, the light output from the first display module may be delivered through the optical system and then reflected by the first glass (e.g., the first glass 215 of FIG. 2) to be recognized by the user's left eye, and the light output from the second display module may be delivered through the optical system and then reflected by the second glass (e.g., the second glass 225 of FIG. 2) to be recognized by the user's right eye.

According to an embodiment, the first display module 1010 may include a first display panel and a first display driving circuit for emitting light from a plurality of pixels of the first display panel. The second display module 1060 may include a second display panel and a second display driving circuit for emitting light from a plurality of pixels of the second display panel. The configuration and/or functions of the first display driving circuit and the second display driving circuit may be substantially the same as the display driving circuit (e.g., the display driving circuit 530 of FIG. 5) described above with reference to FIGS. 5 to 9.

According to an embodiment, the display panel of the first display module 1010 and the second display panel of the second display module 1060 may each include N pixel lines in units of rows, and a first EM circuit (or the first light-emitting circuit) outputting a first light-emitting control signal to a specified pixel line (e.g., N-th pixel line) of the first display module and a second EM circuit (or the second light-emitting circuit) outputting a second light-emitting control signal to a specified pixel line (e.g., N-th pixel line) of the second display module may be electrically connected, directly or indirectly, to each other.

According to an embodiment, the first display module 1010 and the second display module 1060 may synchronize light-emitting activation signals (e.g., EM_STV) and clock signals (e.g., EM_CLK, EM_CLKB) for controlling light-emitting timing of the display panel.

Referring to FIG. 10, the first display module 1010 may include a plurality of first EM circuits 1020 that provide light-emitting control signals to pixel lines in units of rows. In addition, the second display module 1060 may include a plurality of second EM circuits 1070 that provide light-emitting control signals to pixel lines in units of rows.

According to an embodiment, the first EM circuit 1020 and the second EM circuit 1070 corresponding to each pixel line may be electrically connected to each other. The clock signals (EM_CLK_L and EM_CLKB_L) provided from the first display driving circuit to the first EM circuit 1020 may be provided to the second EM circuit 1070 electrically connected thereto, and accordingly, the timings of the clock signals (EM_CLK_R and EM_CLKB_R) of the second EM circuit 1070 may be synchronized with the timings of the clock signals (EM_CLK_L and EM_CLKB_L) of the first EM circuit. In addition, the light-emitting activation signal (EM_STV_L) provided from the first display driving circuit to the first EM circuit 1020 may be provided to the electrically connected second EM circuit 1070, and accordingly, the timing of the light-emitting duty of the light-emitting activation signal EM_STV_R of the second EM circuit may be synchronized with the timing of the first EM circuit. Accordingly, the light-emitting duty timings of the first light-emitting control signal output from the first EM circuit and the second light-emitting control signal output from the 2EM circuit may be configured to be synchronized with each other, so that specified pixel lines of the first display panel of the first display module 1010 and the second display panel of the second display module 1060 may emit light at substantially the same timing.

In this way, even in a situation where the driving frequency of the display is changed and the light-emitting duty is adjusted, it is possible to change the driving frequency seamlessly.

Figure 11:
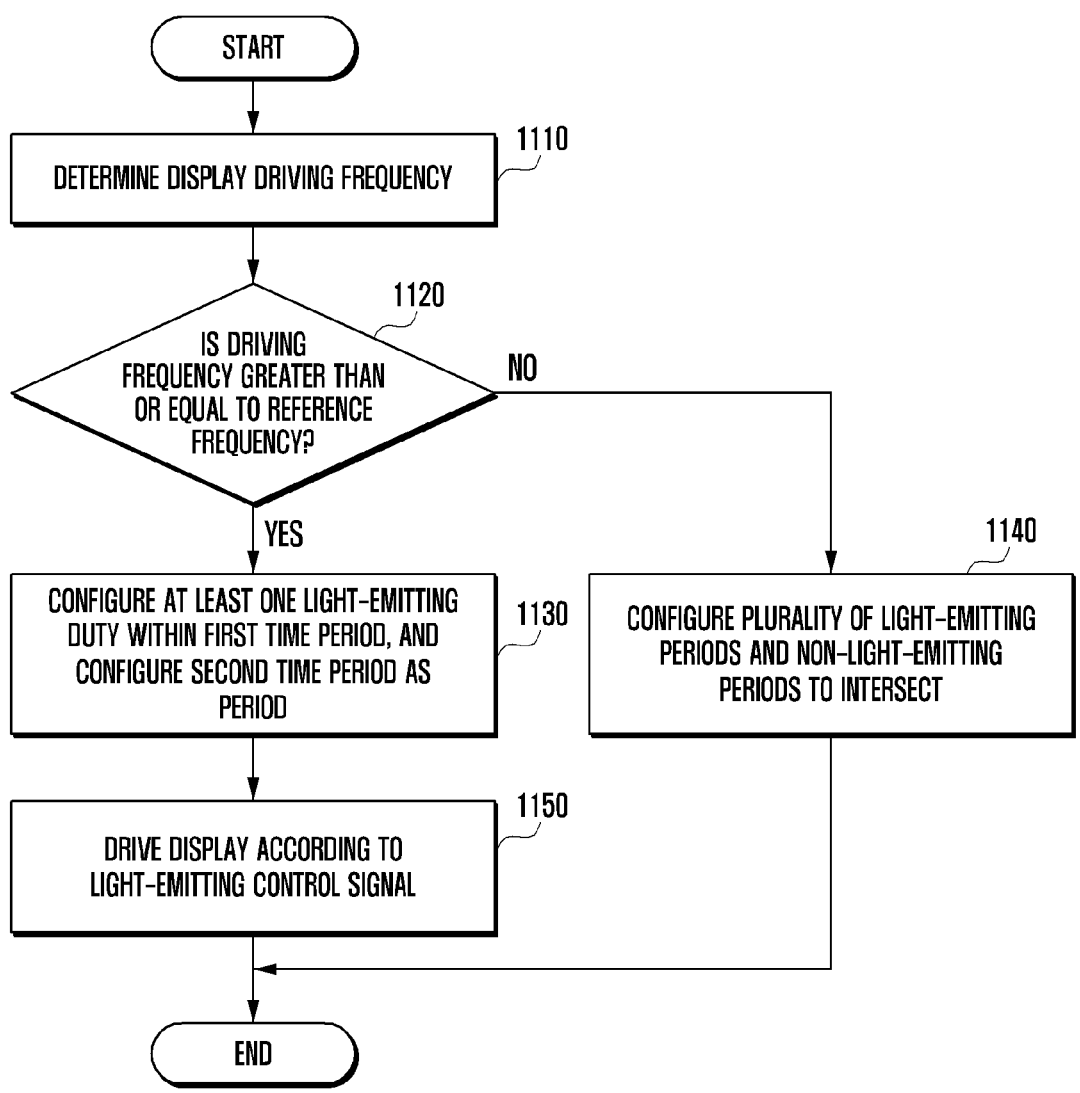
FIG. 11 is a flowchart of a display driving method of an electronic device according to various example embodiments.

FIG. 11 is a flowchart of a display driving method of an electronic device according to various embodiments of the display.

The method illustrated in FIG. 11 may be performed by the electronic device (e.g., the processor 540 and/or the display driving circuit 530 of the electronic device 500 of FIG. 5) described with reference to FIGS. 1 to 10, and hereinafter, descriptions of the technical features that have been described above will be omitted. In the following embodiments, each operation may be performed sequentially, but not necessarily sequentially. For example, the order of each operation may be changed, or at least two operations may be performed in parallel.

According to various embodiments, in operation 1110, the display driving circuit (e.g., the display driving circuit 530 of FIG. 5) of the electronic device may determine a driving frequency for displaying image data provided from the processor (e.g., the processor 540 of FIG. 5) on the display panel (e.g., the display panel 520 of FIG. 5).

According to various embodiments, in operation 1120, the electronic device may identify whether the determined driving frequency is greater than or equal to the reference frequency. Here, the reference frequency may be 70 Hz, but is not limited thereto.

According to various embodiments, in operation 1130, when the determined driving frequency is greater than or equal to the reference frequency, the display driving circuit may configure a light-emitting period including at least one light-emitting duty for emitting light from a plurality of pixels within a first time period from a data refresh timing to a specified time point in one refresh cycle, and configure the second time period from the specified time to the next data refresh timing as a non-light-emitting period in which the plurality of pixels do not emit light.

According to various embodiments, in operation 1140, when the determined driving frequency is less than the reference frequency, the display driving circuit may configure a light-emitting control signal so that a plurality of light-emitting periods and non-light-emitting periods intersect.

According to the first embodiment, the display driving circuit may configure the first time period as one light-emitting duty when the determined driving frequency is greater than or equal to a specified reference frequency (e.g., 70 Hz). When the determined driving frequency is less than the specified reference frequency (e.g., 70 Hz), the display driving circuit may configure a plurality of light-emitting periods and non-light-emitting periods to cross during one refresh cycle. For example, the display driving circuit may configure only one light-emitting duty for one refresh cycle when the driving frequency is greater than or equal to the reference frequency, and configure two or more light-emitting duties for one refresh cycle when the driving frequency is less than the reference frequency. The first embodiment has been previously described with reference to FIGS. 8A and 8B.

According to the second embodiment, when the determined driving frequency is greater than or equal to the specified reference frequency, the display driving circuit may configure a plurality of light-emitting duties during the first time period. Unlike the first embodiment, in the second embodiment, instead of one light-emitting duty in the light-emitting period, a plurality of light-emitting duties having a small time width may be collected and configured as the light-emitting period. When driving at a high frequency above the reference frequency, a plurality of light-emitting duties may be gathered to form a light-emitting period, and one refresh cycle may be composed of a light-emitting period including a plurality of light-emitting duties and a non-light-emitting period in which no light-emitting duty is configured. The second embodiment has been previously described with reference to FIGS. 9A to 9C.

According to various embodiments, in operation 1150, the display driving circuit may drive a plurality of pixels of the display panel according to the light-emitting control signal. For example, each pixel may emit light during the light-emitting duty period of the light-emitting control signal and may not emit light during the remaining period.

An electronic device according to various example embodiments may include a display module for displaying image data, and a processor operatively connected, directly or indirectly, to the display module to provide the image data to the display module, and the display module may include a display panel including a plurality of pixel lines including a plurality of pixels, and a display driving circuit for driving a plurality of pixels of the display panel.

According to various embodiments, the display driving circuit may be configured to identify a driving frequency for displaying the image data provided from the processor on the display panel, and output a light-emitting control signal for emitting light from a specified pixel line among the plurality of pixel lines to the display panel, based on the identified driving frequency, and the display driving circuit may be configured to, when the identified driving frequency is greater than or equal to the specified reference frequency, configure a first time period from a data refresh timing to a specified time point during one refresh cycle as a light-emitting period for emitting light from the specified pixel line to configure a plurality of light-emitting duties for emitting light from the designated pixel line within the first time period, and configure a second time period from the specified time point to the next data refresh timing as a non-light-emitting period for not emitting light from the specified pixel line not to configure the light-emitting duty for the specified pixel line.

According to various embodiments, the display driving circuit may be configured to, when the identified driving frequency is less than the reference frequency, configure a plurality of light-emitting periods and a plurality of non-light-emitting periods to cross each other, and configure a plurality of light-emitting duties during the plurality of light-emitting periods and may be configured not to configure the light-emitting duty during the plurality of non-light-emitting periods.

According to various embodiments, the display driving circuit may be configured to, when the identified driving frequency is less than the reference frequency, configure a plurality of light-emitting duties during a third time period from the data refresh timing to a first time point during one refresh cycle, not configure a light-emitting duty during a fourth time period from the first time point to a second time point, configure a plurality of light-emitting duties during a fifth time period from the second time point to a third time point, and not configure a light-emitting duty during a sixth time period from the third time point to the next data refresh timing.

According to various embodiments, the display driving circuit may be configured to, when the identified driving frequency is less than the reference frequency, configure a plurality of light-emitting duties at equal intervals during the one refresh cycle.

According to various embodiments, widths and intervals of the plurality of light-emitting duties configured in the first time period may be substantially the same as each other.

According to various embodiments, the display driving circuit may be configured to, when the driving frequency is changed, determine the number of light-emitting duties configured in the first time period based on the changed driving frequency.

According to various embodiments, the display driving circuit may be configured to, when the driving frequency is changed, determine the number of light-emitting duties configured in the first time period in inverse proportion to the change in the driving frequency.

According to various embodiments, the display driving circuit may be configured to, when the driving frequency is changed, maintain widths and intervals of the plurality of light-emitting duties.

According to various embodiments, the electronic device may include a first display module for forming an image corresponding to the location of the user's left eye, and a second display module for forming an image corresponding to the location of the user's right eye, and a first light-emitting circuit outputting a first light-emitting control signal to a specified pixel line of the first display module and a second light-emitting circuit outputting a second light-emitting control signal to a specified pixel line of the second display module may be electrically connected, directly or indirectly, to each other, and timings of light-emitting duty of the first light-emitting control signal and the second light-emitting control signal may be synchronized with each other.

According to various embodiments, a first light-emitting activation signal output from the first light-emitting circuit and a second light-emitting activation signal output from the second light-emitting circuit may be synchronized with each other, and a first clock signal output from the first light-emitting circuit and a second clock signal output from the second light-emitting circuit may be synchronized with each other.

According to various embodiments, the display driving circuit may be configured to determine the driving frequency based on the rendering frequency of the image data received from the processor, or identify the driving frequency determined from the processor.

According to various embodiments, the electronic device may be a wearable electronic device providing a virtual reality (VR) or augmented reality (AR) environment.

A method for driving a display of an electronic device according to various example embodiments may include identifying a driving frequency for displaying image data on a display panel, generating a light-emitting control signal for emitting light from a specified pixel line among the plurality of pixel lines of the display panel, based on the identified driving frequency, and outputting the generated light-emitting control signal to the display panel. "Based on" as used herein covers based at least on.

According to various embodiments, the generating of the light-emitting control signal may include, when the identified driving frequency is greater than or equal to the specified reference frequency, configuring a first time period from a data refresh timing to a specified time point in one refresh cycle as a light-emitting period for emitting light from the specified pixel line to configure a plurality of light-emitting duties for emitting light from the specified pixel line within the first time period, and configuring a second time period from the specified time point to the next data refresh timing as a non-light-emitting period for not emitting light from the specified pixel line not to configure the light-emitting duty for the specified pixel line.

According to various embodiments, the generating of the light-emitting control signal may include, when the determined driving frequency is less than the reference frequency, configuring a plurality of light-emitting periods and a plurality of non-light-emitting periods to cross each other, and configuring a plurality of light-emitting duties during the plurality of light-emitting periods, and not configuring the light-emitting duty during the plurality of non-light-emitting periods.

According to various embodiments, the generating of the light-emitting control signal may include, when the identified driving frequency is less than the reference frequency, configuring a plurality of light-emitting duties at equal intervals during the one refresh cycle.

According to various embodiments, widths and intervals of the plurality of light-emitting duties configured in the first time period may be substantially the same as each other.

Each embodiment herein may be used in combination with any other embodiment(s) described herein.

According to various embodiments, the generating of the light-emitting control signal may include, when the driving frequency is changed, determining the number of light-emitting duties configured in the first time period based on the changed driving frequency.

According to various embodiments, the generating of the light-emitting control signal may include, when the driving frequency is changed, determining the number of light-emitting duties configured in the first time period in inverse proportion to the change in the driving frequency.

According to various embodiments, the electronic device may include a first display module for forming an image corresponding to the location of the user's left eye and a second display module for forming an image corresponding to the location of the user's right eye, a first light-emitting circuit outputting a first light-emitting control signal to a specified pixel line of the first display module and a second light-emitting circuit outputting a second light-emitting control signal to a specified pixel line of the second display module may be electrically connected to each other, timings of light-emitting duty of the first light-emitting control signal and the second light-emitting control signal may be synchronized with each other, a first light-emitting activation signal output from the first light-emitting circuit and a second light-emitting activation signal output from the second light-emitting circuit may be synchronized with each other, and a first clock signal output from the first light-emitting circuit and a second clock signal output from the second light-emitting circuit may be synchronized with each other.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

a display configured to display image data; and a processor operatively connected to the display and configured to provide the image data to the display, wherein the display comprises:

a display panel including a plurality of pixel lines and a plurality of pixels; and display driving circuitry configured to drive a plurality of pixels of the display panel, wherein the display driving circuitry is configured to:

identify a driving frequency for displaying the image data on the display panel; and output a light-emitting control signal for emitting light from at least a specified pixel line among the plurality of pixel lines to the display panel, based on the identified driving frequency, and wherein the display driving circuitry is configured to, in a case where the identified driving frequency is greater than or equal to the specified reference frequency:

configure a first time period from a data refresh timing to a specified time point in a refresh cycle as a light-emitting period for emitting light from the specified pixel line;

configure a plurality of light-emitting duties for emitting light from the specified pixel line within the first time period; and configure a second time period from the specified time point to a next data refresh timing as a non-light-emitting period for not emitting light from the specified pixel line.

2. The electronic device of claim 1, wherein the display driving circuitry is configured to:

configure a plurality of light-emitting periods and a plurality of non-light-emitting periods to cross each other in a case where the identified driving frequency is less than the reference frequency; and configure a plurality of light-emitting duties during the plurality of light-emitting periods and not configure the light-emitting duty during the plurality of non-light-emitting periods.

3. The electronic device of claim 1, wherein the display driving circuitry is configured to, in a case that the identified driving frequency is less than the reference frequency:

configure a plurality of light-emitting duties during a third time period from the data refresh timing to a first time point during a refresh cycle;

not configure a light-emitting duty during a fourth time period from the first time point to a second time point;

configure a plurality of light-emitting duties during a fifth time period from the second time point to a third time point; and not configure a light-emitting duty during a sixth time period from the third time point to the next data refresh timing.

4. The electronic device of claim 1, wherein the display driving circuitry is configured to configure a plurality of light-emitting duties at equal intervals during the refresh cycle in a case where the identified driving frequency is less than the reference frequency.

5. The electronic device of claim 1, wherein widths and intervals of the plurality of light-emitting duties configured in the first time period are substantially equal to each other.

6. The electronic device of claim 1, wherein the display driving circuitry is configured to determine a number of light-emitting duties configured in the first time period based on the changed driving frequency in a case where the driving frequency is changed.

7. The electronic device of claim 6, wherein the display driving circuitry is configured to determine the number of light-emitting duties configured in the first time period in inverse proportion to the change in the driving frequency in a case where the driving frequency is changed.

8. The electronic device of claim 6, wherein the display driving circuitry is configured to maintain widths and intervals of the plurality of light-emitting duties in a case where the driving frequency is changed.

9. The electronic device of claim 1, comprising:

a first display module, comprising a display, configured to form an image corresponding to a location of a user's left eye; and a second display module, comprising a display, configured to form an image corresponding to a location of a user's right eye, wherein a first light-emitting circuit for outputting a first light-emitting control signal to a specified pixel line of the first display module and a second light-emitting circuit for outputting a second light-emitting control signal to a specified pixel line of the second display module are electrically connected to each other, and wherein timings of light-emitting duty of the first light-emitting control signal and the second light-emitting control signal are synchronized with each other.

10. The electronic device of claim 9, wherein the light-emitting circuits are configured so that a first light-emitting activation signal output from the first light-emitting circuit and a second light-emitting activation signal output from the second light-emitting circuit are synchronized with each other, and wherein the light-emitting circuits are configured so that a first clock signal output from the first light-emitting circuit and a second clock signal output from the second light-emitting circuit are synchronized with each other.

11. The electronic device of claim 1, wherein the display driving circuitry is configured to:

determine the driving frequency based on a rendering frequency of the image data received from the processor; or identify the driving frequency determined from the processor.

12. The electronic device of claim 1, wherein the electronic device is a wearable electronic device for providing a virtual reality (VR) and/or augmented reality (AR) environment.

13. A method for driving a display of an electronic device, the method comprising:

identifying a driving frequency for displaying image data on the display;

generating a light-emitting control signal for emitting light from a specified pixel line among a plurality of pixel lines of the display, based on the identified driving frequency; and outputting the generated light-emitting control signal to the display, wherein the generating of the light-emitting control signal comprises, in a case where the identified driving frequency is greater than or equal to a specified reference frequency:

configuring a first time period from a data refresh timing to a specified time point in one refresh cycle as a light-emitting period for emitting light from the specified pixel line;

configuring a plurality of light-emitting duties for emitting light from the specified pixel line within the first time period; and configuring a second time period from the specified time point to a next data refresh timing as a non-light-emitting period for not emitting light from the specified pixel line.

14. The method of claim 13, wherein the generating of the light-emitting control signal comprises:

configuring a plurality of light-emitting periods and a plurality of non-light-emitting periods to cross each other in a case where the identified driving frequency is less than the reference frequency; and configuring a plurality of light-emitting duties during the plurality of light-emitting periods, and not configuring the light-emitting duty during the plurality of non-light-emitting periods.

15. The method of claim 13, wherein the generating of the light-emitting control signal comprises configuring a plurality of light-emitting duties at equal intervals during the one refresh cycle in a case where the identified driving frequency is less than the reference frequency.

16. The method of claim 13, wherein widths and intervals of the plurality of light-emitting duties configured in the first time period are substantially equal to each other.

17. The method of claim 13, wherein the generating of the light-emitting control signal comprises determining a number of light-emitting duties configured in the first time period based on the changed driving frequency in a case where the driving frequency is changed.

18. The method of claim 17, wherein the generating of the light-emitting control signal comprises determining the number of light-emitting duties configured in the first time period in inverse proportion to the change in the driving frequency in a case where the driving frequency is changed.

19. The method of claim 13, wherein the electronic device comprises:

a first display module, comprising a display, for forming an image corresponding to a location of a user's left eye; and a second display module, comprising a display, for forming an image corresponding to a location of a user's right eye, wherein a first light-emitting circuit outputting a first light-emitting control signal to a specified pixel line of the first display module and a second light-emitting circuit outputting a second light-emitting control signal to a specified pixel line of the second display module are electrically connected to each other, wherein timings of light-emitting duty of the first light-emitting control signal and the second light-emitting control signal are synchronized with each other, wherein a first light-emitting activation signal output from the first light-emitting circuit and a second light-emitting activation signal output from the second light-emitting circuit are synchronized with each other, and wherein a first clock signal output from the first light-emitting circuit and a second clock signal output from the second light-emitting circuit are synchronized with each other.

* * * * *